US009594220B1

(12) United States Patent
Sutherland

(10) Patent No.: US 9,594,220 B1
(45) Date of Patent: Mar. 14, 2017

(54) OPTICAL INTERFACE DEVICE HAVING A CURVED WAVEGUIDE USING LASER WRITING AND METHODS OF FORMING

(71) Applicant: CORNING OPTICAL COMMUNICATIONS LLC, Hickory, NC (US)

(72) Inventor: James Scott Sutherland, Corning, NY (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/861,429

(22) Filed: Sep. 22, 2015

(51) Int. Cl.
G02B 6/26 (2006.01)
G02B 6/42 (2006.01)
G02B 6/30 (2006.01)
C03C 23/00 (2006.01)
C03B 23/023 (2006.01)
C03B 23/00 (2006.01)

(52) U.S. Cl.
CPC ........ *G02B 6/4214* (2013.01); *C03B 23/0006* (2013.01); *C03B 23/023* (2013.01); *C03C 23/0025* (2013.01); *G02B 6/30* (2013.01); *G02B 6/4206* (2013.01)

(58) Field of Classification Search
CPC ...... G02B 6/4214; G02B 6/30; G02B 6/4206; C03B 23/0006; C03B 23/023; C03B 23/0025
USPC .......... 385/15, 31–33, 49–53, 66, 88, 92–94
See application file for complete search history.

(56) References Cited

U.S. PATENT DOCUMENTS

| 5,155,785 A | * | 10/1992 | Holland | G02B 6/3608 |
| | | | | 156/158 |
| 6,116,791 A | * | 9/2000 | Laninga | G02B 6/3829 |
| | | | | 385/83 |
| 6,393,185 B1 | * | 5/2002 | Deacon | G02B 6/12004 |
| | | | | 385/12 |
| 6,402,389 B1 | | 6/2002 | Steijer et al. | 385/65 |

(Continued)

FOREIGN PATENT DOCUMENTS

| CN | 102116898 A | 7/2011 | ............. G02B 6/122 |
| DE | 102012110903 A1 | 5/2014 | ............... G02B 6/38 |

(Continued)

OTHER PUBLICATIONS

Direct Write Fabrication of Waveguides and Interconnects for Optical Printed Wiring Boards by Dingledein, PhD diissertation from Michigan tech, published 2012.*

(Continued)

*Primary Examiner* — Ryan Lepisto
*Assistant Examiner* — Guy Anderson

(57) ABSTRACT

An optical interface device for optically connecting photonic devices to optical device along with methods of making. The method includes providing a glass support member that is either monolithic or laminated. A laser beam is used to write cores in the body of the support member. The support member includes a bend section and the cores generally follow the bend section and serve to define curved optical waveguides. The cores provide strong out-of-plane optical confinement, thereby allowing for strong bends and therefore a compact design for the optical interface device.

18 Claims, 18 Drawing Sheets

(56) References Cited

U.S. PATENT DOCUMENTS

| | | | |
|---|---|---|---|
| 6,907,173 B2* | 6/2005 | Hiramatsu | G02B 6/122 |
| | | | 385/123 |
| 6,931,167 B2* | 8/2005 | Ohtsu | G02B 6/138 |
| | | | 264/1.24 |
| 7,031,584 B2* | 4/2006 | Lee | G02B 6/138 |
| | | | 385/129 |
| 7,329,050 B1 | 2/2008 | Dugan et al. | 385/55 |
| 7,359,594 B2* | 4/2008 | Nishizawa | G02B 6/4214 |
| | | | 385/14 |
| 7,400,797 B2 | 7/2008 | Bhagavatula et al. | 385/32 |
| 7,625,138 B2* | 12/2009 | Hamazaki | G02B 6/421 |
| | | | 385/14 |
| 7,665,911 B2* | 2/2010 | Hamazaki | G02B 6/421 |
| | | | 385/14 |
| 7,802,927 B2* | 9/2010 | Benjamin | G02B 6/25 |
| | | | 385/31 |
| 7,894,691 B2* | 2/2011 | Ikeda | G02B 6/43 |
| | | | 385/14 |
| 8,270,784 B2* | 9/2012 | Thomson | G02B 6/30 |
| | | | 385/135 |
| 8,442,368 B1* | 5/2013 | Reano | G02B 6/132 |
| | | | 385/29 |
| 9,348,090 B2* | 5/2016 | Sasaoka | G02B 6/262 |
| 9,442,249 B2* | 9/2016 | Yoshida | G02B 6/13 |
| 2002/0012504 A1* | 1/2002 | Gillham | G02B 6/3829 |
| | | | 385/86 |
| 2003/0017640 A1 | 1/2003 | Foley Barenburg et al. | |
| 2003/0099452 A1 | 5/2003 | Borrelli et al. | 385/129 |
| 2004/0120676 A1* | 6/2004 | Lee | G02B 6/138 |
| | | | 385/129 |
| 2004/0184704 A1* | 9/2004 | Bakir | G02B 6/12002 |
| | | | 385/14 |
| 2004/0197045 A1* | 10/2004 | Lappohn | G02B 6/3885 |
| | | | 385/14 |
| 2004/0258359 A1* | 12/2004 | Corkum | B82Y 20/00 |
| | | | 385/39 |
| 2005/0058399 A1 | 3/2005 | Nishizawa et al. | |
| 2006/0002443 A1* | 1/2006 | Farber | H01S 5/141 |
| | | | 372/50.1 |
| 2006/0165341 A1* | 7/2006 | Yan | G02B 6/12019 |
| | | | 385/8 |
| 2007/0201793 A1* | 8/2007 | Askins | G02B 6/02042 |
| | | | 385/37 |
| 2009/0097364 A1* | 4/2009 | Tawa | G11B 5/314 |
| | | | 369/13.17 |
| 2009/0310906 A1 | 12/2009 | Miyatake | 385/14 |
| 2010/0247042 A1* | 9/2010 | Suzuki | G02B 6/4249 |
| | | | 385/88 |
| 2011/0123149 A1* | 5/2011 | Hemenway, Jr. | G02B 6/4236 |
| | | | 385/32 |
| 2013/0170802 A1 | 7/2013 | Pitwon | |
| 2013/0223795 A1 | 8/2013 | Sasaoka et al. | |
| 2013/0322814 A1 | 12/2013 | Lee | 385/14 |

FOREIGN PATENT DOCUMENTS

| | | | | |
|---|---|---|---|---|
| EP | 2546688 A1 | 7/2011 | | G02B 6/36 |
| JP | 200446031 A | 2/2004 | | G02B 6/13 |
| JP | 200510373 A | 1/2005 | | G02B 6/13 |
| JP | 3649835 B2 | 5/2005 | | G02B 6/10 |
| JP | 2005156945 A | 6/2005 | | G02B 6/10 |
| JP | 2005292718 A | 10/2005 | | G02B 6/00 |
| JP | 2006201014 A | 8/2006 | | G01H 9/00 |
| JP | 3925209 B2 | 6/2007 | | G02B 6/13 |
| JP | 200820766 A | 1/2008 | | G02B 6/00 |
| JP | 4514999 B2 | 7/2010 | | G02B 6/12 |
| JP | 5102550 B2 | 12/2012 | | G02B 6/42 |
| WO | WO03003060 A2 | 1/2003 | | |
| WO | WO2012150568 A1 | 11/2012 | | G06N 99/00 |

OTHER PUBLICATIONS

Air Trench Bends and Splitters for Dense Optical Integration in Low Index Contrast, Akiyama et al., Journal of Lightwave Technology, vol. 23, No. 7, Jul. 2005, 7 pages.

Application of V-Groove Technology for Small Form Factor Connector and Transceiver Modules, Berglund et al., 1999 Electronic Components and Technology Conference, 6 pages.

Continuous wave ridge waveguide lasers in femtosecond laser micromachined ion irradiated Nk:YAG single crystals, Jia et al., Optical Materials Express, vol. 2, No. 5, May 1, 2012, 6 pages.

Deeply Etched SiO2 Ridge Waveguide for Sharp Bends, Dai et al., Journal of Lightwave Technology, vol. 24, No. 12, Dec. 2006, 6 pages.

Fabrication of ridge waveguides by femtosecond-laser structuring of (Yb,Nb):RTP/RTP using beam multiplexing with a Spatial Light Modulator, A. Ruiz de las Cruz et al., Lasers and Electro-Optics Europe (CLEO Europe/IQEC), 2013, 1 page.

Heat accumulation effects in femtosecond laser-written waveguides with variable repetition rate, Eaton et al., Optics Express, vol. 13, No. 12, Jun. 13, 2005, 9 pages.

High-Coupling-Efficiency Optical Interconnection Using a 90°-Bent Fiber Array Connector in Optical Printed Circuit Boards, Cho et al., Photonics Technology Letters, vol. 17, No. 3, Mar. 2005, 3 pages.

Laser-written high-contrast waveguides in glass, Streltsov et al., Proceedings of the SPIE, vol. 7366, id. 736611, 2009, 8 pages.

Laser-Written Optical-Path Redirected Waveguide Device for Optical Back-Plane Interconnects, Hiramatsu et al., Photonics Technology Letters, vol. 16, No. 9, Sep. 2004, 3 pages.

Low bend loss waveguides and photonic bandgaps enabled by high index contrast modifications, Gross et al., MATEC Web of Conferences 8, 06009, 2013, 2 pages.

Ultrafast Laser Fabrication of 3D Photonic Components in Flexible Glasses, Huang et al., Optical Fiber Communications Conference and Exhibition (OFC), 2014, 3 pages.

Vertically Pluggable and Compact 10-Gb/s 12-Channel Optical Modules With Anisotropic Conductive Film for Over 100-Gb/s Optical Interconnect Systems, Suzuki et al., Journal of Lightwave Technology, vol. 27, No. 15, Aug. 2009, 10 pages.

International Search Report and Written Opinion PCT/US2016/050641 Dated Nov. 29, 2016.

\* cited by examiner

OPTICAL INTERFACE DEVICE HAVING A CURVED WAVEGUIDE USING LASER WRITING AND METHODS OF FORMING

FIELD

The present disclosure relates to optical interface devices, and in particular relates to a method of forming an optical interface device having a curved waveguide formed using laser writing where the optical interface device is used to form optical interconnections between a photonic device supported by a photonic integrated circuit board and another optical device such as an optical fiber connector or an electrical-optical device.

BACKGROUND

Certain optical and electrical-optical devices have photonic integrated circuit boards (PICBs) that need to be optically interfaced (optically coupled) with another optical device so that optical signals can be received and processed by the device, and also transmitted from the device to another device or to a back plane or to the PICB. This often requires plug-in or receptacle optical connectors that, in some respects, may be similar to plug-in and receptacle electrical connectors used for electrical circuit-board components. Alternatively, the optical interface may be accomplished with a connector end adapted to be permanently (or semi-permanently) fixed to the PICB to establish and maintain optical communication with corresponding devices (e.g., photodetectors or phototransmitters) on the PICB.

Because interior space is typically at a premium for most optical and electrical-optical devices, the optical interface devices and the PICBs are preferably compact so that they can fit into tight spaces. For example, multiple PICBs are often arranged in a stacked configuration within data communications racks, so that the height of the optical interface devices is preferably as small as possible while still being able to carry out their function for transmitting optical signals with suitable optical performance.

Consequently, there is a need for continuing improvements to PICB technology that provide for compact configurations while also providing for high-efficiency optical coupling between the PICB and another device to which it is optically coupled.

SUMMARY

An aspect of the disclosure is a method of forming an optical interface device for optically connecting at least one photonic device to at least one optical device via at least one optical fiber, comprising: providing a support member having glass body with a refractive index $n_b$, a proximal end, a distal end and an outer surface, wherein the glass body induces a bend section that includes a curved portion of the outer surface, with the curved portion of the outer surface being interfaced with either air or a dielectric coating having a refractive index $n_1 < n_b$; laser writing at least one core in the glass body, the at least one core having a refractive index $n_c > n_b$ and an outer edge closest to the outer surface and that resides within 10 microns of the curved portion of the outer surface; and wherein the at least one core defines at least one curved optical waveguide.

An optical interface device product formed by a process that includes: providing a support member having glass body with a refractive index $n_b$, a proximal end, a distal end and an outer surface, wherein the glass body includes a bend section that includes a curved portion of the outer surface; scanning a laser beam having a focus spot over the outer surface so that the focus spot resides within the glass body to form within the glass body a core having a refractive index $n_c > n_b$, a curved section within the bend section, and an outer edge closest to the outer surface and that resides within 10 microns of the curved portion of the outer surface, wherein a medium having a refractive index less than the refractive index $n_b$ resides adjacent the outer surface; and wherein the core defines at least one curved optical waveguide.

Another aspect of the disclosure is an optical interface device for optically connecting at least one photonic device to at least one optical device via at least one optical fiber. The optical interface device includes: a support member having a body made of a single glass material and having a refractive index $n_b$, a proximal end, a distal end and an outer surface, wherein the glass body includes a bend section that includes a curved portion of the outer surface, with the curved portion of the outer surface being interfaced with a medium having a refractive index $n_1 < n_b$; at least one core within the body and defined by at least one locally densified portion of the single glass material of body, the at least one core having a refractive index $n_c > n_b$ and an outer edge closest to the outer surface and that resides within 10 microns of the curved portion of the outer surface; and wherein the at least one core defines at least one curved optical waveguide.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation. Likewise, terms such as "vertical" and "horizontal" are used for the sake of reference and are not intended to be limiting as to orientation or direction.

The vertical dimension LY is used to refer to the height of the support member and the relatively small values of LY as discussed below define the low-profile nature of the optical interface devices.

Monolithic Embodiment

Figure 1A:
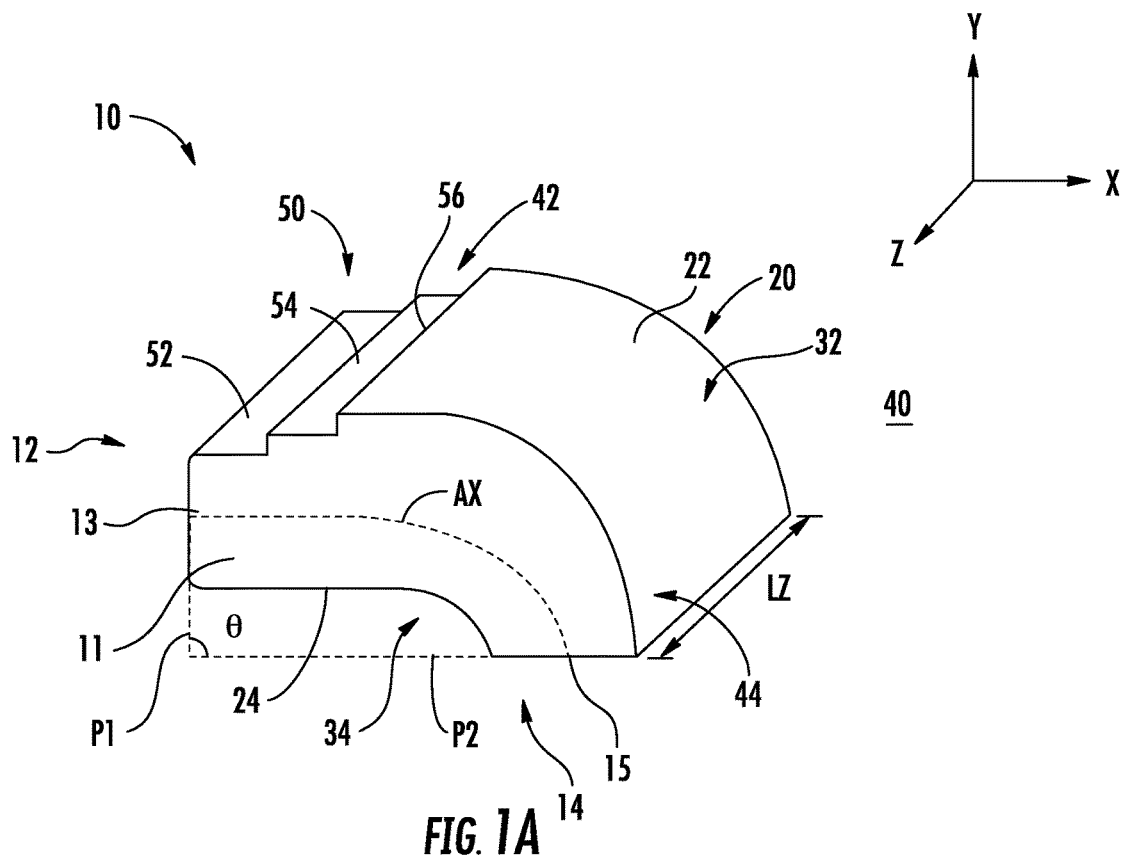
FIG. 1A is a top elevated view and FIG. 1B is a side view of an example curved or "bent" waveguide support member used in forming the optical interface device as disclosed herein.
Figure 1B:
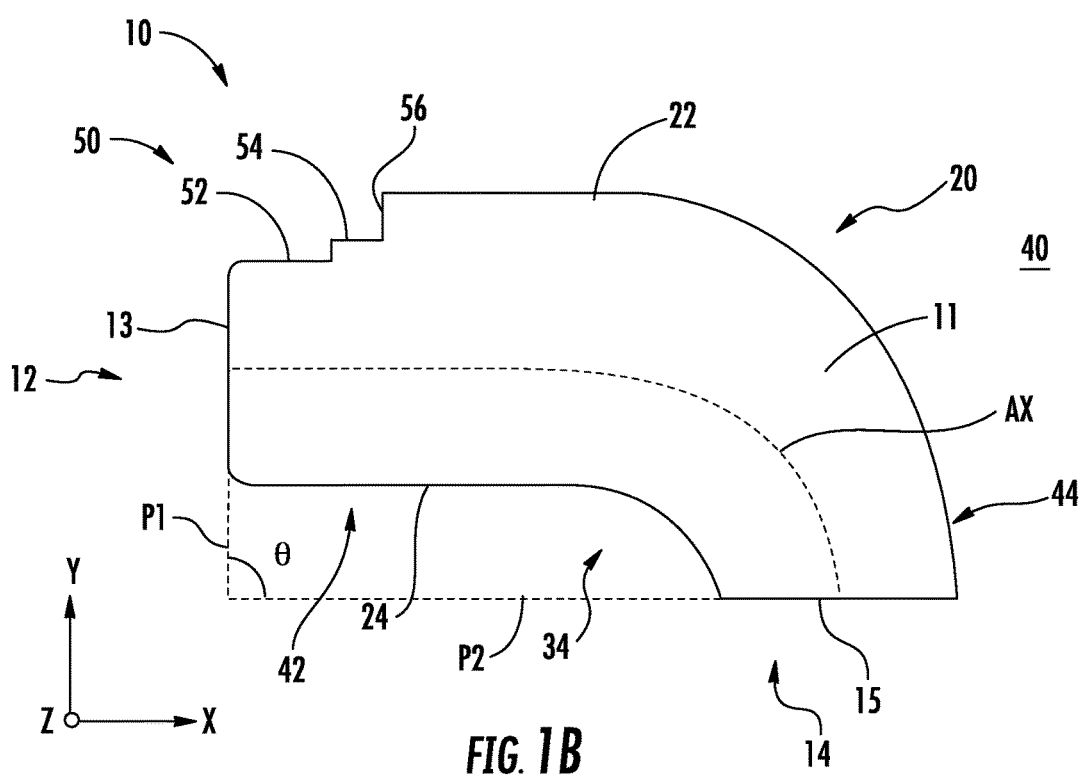

FIG. 1A is a top elevated view and FIG. 1B is a side view of an example curved or "bent" waveguide support member ("support member") 10. The support member 10 has a body 11 that may be made of any suitable material(s) or construction. By way of example and not limitation, body 11 may be monolithic and further in an example is made of a glass with a CTE (Coefficient of Thermal Expansion) close to the CTE of photonic chip materials (e.g., silicon). Example glasses include PYREX® glass, Gorilla® glass and WILLOW® 7740 glass, which may or may not be chemically strengthened. The body 11 has a bulk refractive index $n_b$. The support member 10 includes a proximal end 12 with a planar surface 13, a distal end 14 with a planar surface 15, an upper (or outer) surface 22 and a lower (or inner) surface 24.

The support member 10 also includes a bend section 20 that defines an outer curved portion 32 of upper surface 22 and an inner curved portion 34 of lower surface 24. Depending on the application, the y-axis offset of the lower surface 24 from the planar surface 15 may be greater than a minimum value to provide clearance for other components located beneath the lower surface 24. Alternatively, lower surface 24 may be co-planar with the planar surface 15 if clearance for other components is not required.

The support member 10 has a front-end section 42 that includes proximal end 12 and a back-end section 44 that includes distal end 14. A curved central axis AX runs between the proximal end 12 and the distal end 14. In an example, bend section 20 has an associated bend angle θ defined by the intersection of a first plane P1 defined by proximal-end planar surface 13 and a second plane P2 defined by distal-end planar surface 15. In one example, the bend angle θ can be in the range $45° \leq \theta \leq 90°$, while in other examples the bend angle can be in the range from $60° \leq \theta \leq 90°$ or $80° \leq \theta \geq 90°$. For the bend angle of 90° shown in FIGS. 1A and 1B, the proximal-end planar surface 13 lies in the y-z plane and the distal-end planar surface 15 lies in the x-z plane.

In an example, front-end section 42 includes an optional optical fiber support feature 50, which in an example includes first and second steps 52 and 54 formed in upper surface 22, with the first step being adjacent proximal end 22 and deeper than the second step. The first and second steps 52 and 54 serve as an optical fiber support and strain-relief feature for supporting one or more optical fibers 100, which are discussed below. The second step 54 defines a vertical optical fiber stop surface 56, as explained below.

Figure 1C:
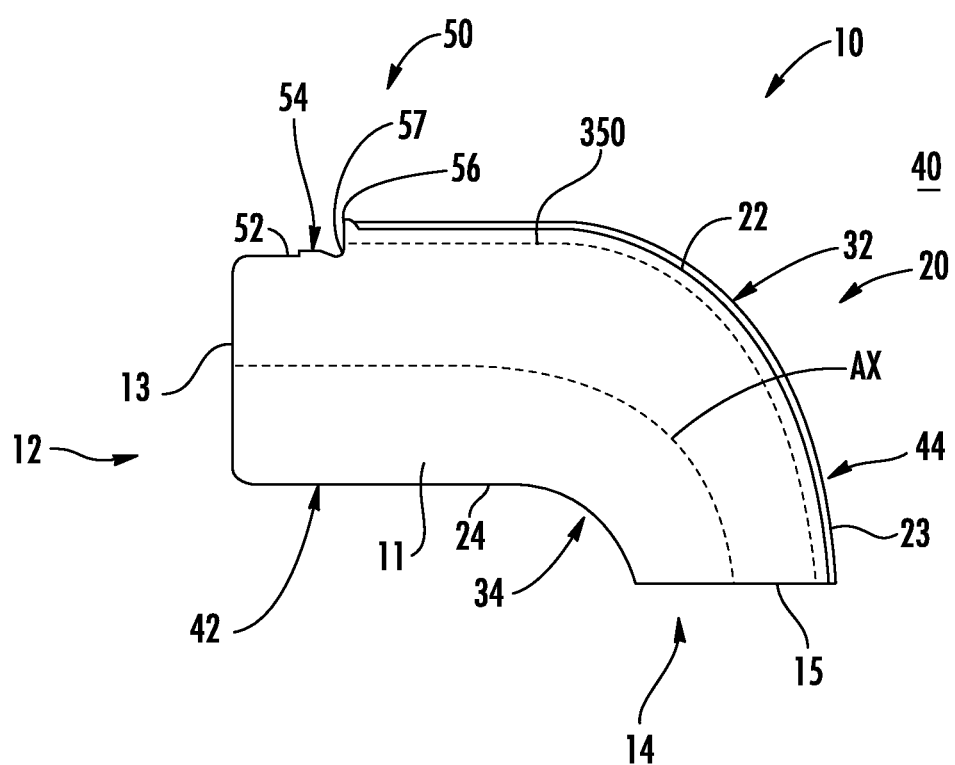
FIG. 1C is similar to FIG. 1B and shows a different configuration for the optical optical fiber support features at the front-end section of the support member, and also shows an example laser-written waveguide formed therein.

The first and second steps 52 and 54 may include other features, such as a raised ridge 55 or a trench 57, as shown in FIG. 1C if desired. The ridge and trench features 55 and 57 can experience some rounding during drawing while allowing the optical fiber stop surface 56 to remain flat in drawing. The trench 57 also serves as a reservoir to capture excess optical fiber attachment material. If the raised ridge 55 interferes with the laser writing process by distorting the surface profile, it can be easily removed via a post-draw polishing step.

Figure 2A:
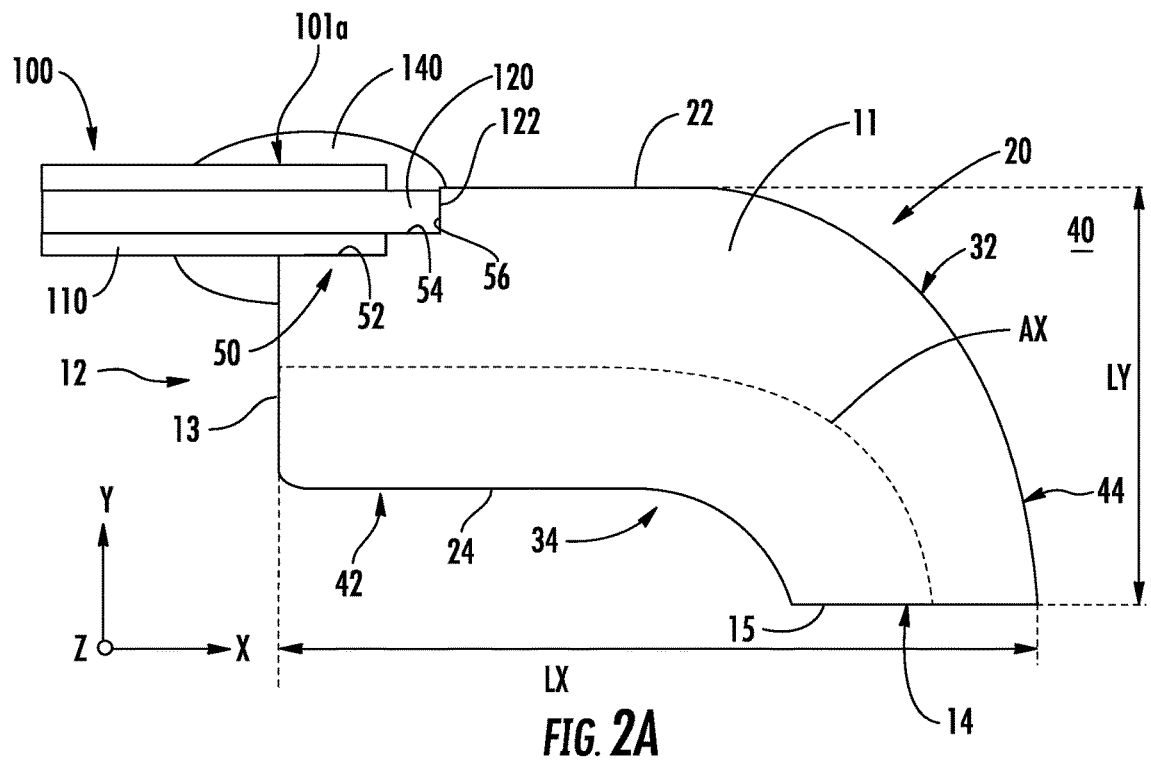
FIG. 2A is similar to FIG. 1B and shows an optical fiber operably attached to the front-end section of the support member using an adhesive material.

FIG. 2A is similar to FIG. 1B and shows an optical fiber 100 operably arranged at the front-end section 42 of support member 10 at fiber support feature 50. When support member 10 is formed using a drawing process, the drawing process ensures that the optical fiber stop surface 56 is flat. Thus, as long as the optical fibers 100 are all cleaved to the same length (via for example, precision laser cleaving and/or polishing), any suitable gap distance between the bare optical fiber end faces 122 and the optical fiber stop surface 56 should be acceptably small for acceptable optical performance. As discussed below, an index-matching material can be used to fill the gap between the bare optical fiber end faces 122 and the optical fiber stop surface 56 to make the optical coupling more efficient.

If the first and second steps 52 and 54 of optical fiber support feature 50 cannot be accurately formed during the drawing process, they can be created via post-draw grinding or sawing operations. In particular, optical fiber stop surface 56 needs to be smooth and flat to provide a low-loss interface for optical fiber coupling. If this vertical surface cannot be formed during drawing due to excessive rounding of surfaces, it may be necessary to flatten it after drawing e.g., via diamond sawing or the like.

In one embodiment, the support member 10 has a length LX in the x-direction, a length LY in the y-direction (i.e., a "vertical" dimension or "height") and a length LZ (i.e., a "width") in the z-direction. In an example, LX is in the range 4 millimeters (mm) to 6 mm, LY is in the range 2 mm to 4 mm and LZ is in the range 2 mm to 4 mm. Of course, the concepts disclosed herein may be used with device having other sizes as desired.

In an example, support member 10 is formed using glass drawing techniques known in the art. Glass drawing techniques allow for the use of a preform that has the same overall shape as the final support member but larger dimensions. The glass preform is then drawn to form the reduced-dimension support member 10. In an example, a glass preform having dimensions of LX'=5 centimeters (cm), LY'=3 cm and LZ=40 cm was drawn to form a support member having corresponding dimensions LX=5 mm, LY=3 mm and LZ=40 mm. In an example, support member 10 can be polished after it is drawn to ensure that the front-end and back-end planar surfaces 13 and 15 are truly flat and that any sharp corners are rounded off.

FIG. 1C shows support member 10 having a laser-written waveguide 350 formed therein adjacent outer surface 22. The process of forming laser-written waveguide 350 and its various configurations and properties are discussed in greater detail below. With reference to FIG. 1C, outer curved portion 32 of outer surface 22 at bend section 20 may induce scattering losses in a laser-written waveguide 350 (dashed line) in regions where debris comes in contact with this surface. Thus, in an example, outer surface 22 (and especially at outer curved portion 32 of bend section 20) interfaces with a low-index coating 23 of refractive index $n_1 < n_b$ to reduce or prevent such optical loss by maintaining a debris-free surface. In an example, low-index coating 23 is made of a polymer. In another embodiment, at least the outer curved portion 32 of outer surface 22 interfaces directly (i.e., has a boundary interface) with an outside environment 40, which in an example is air.

Figure 2B:
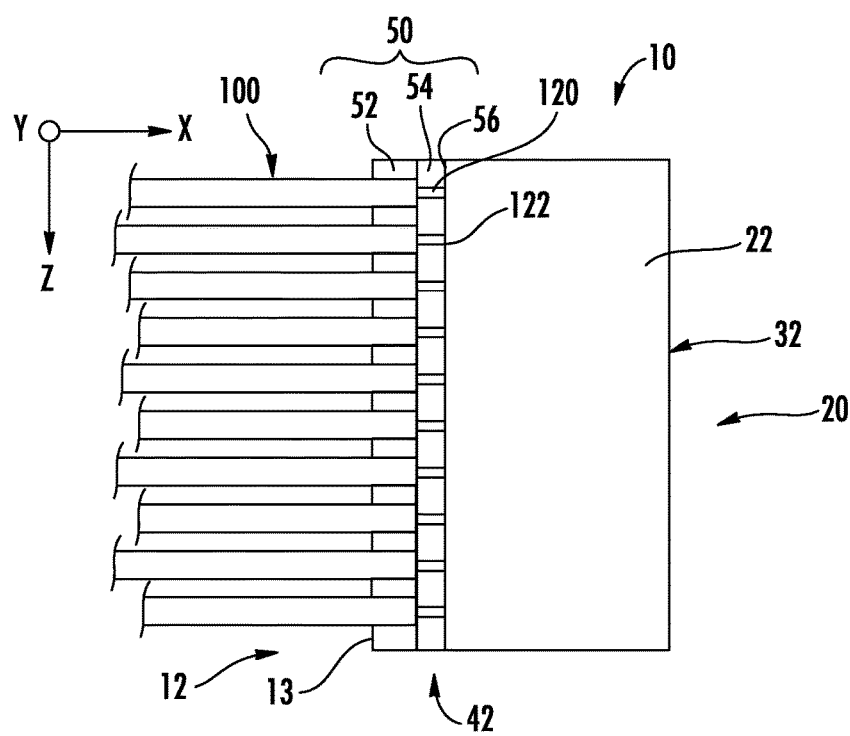
FIG. 2B is a top-down view of the structure of FIG. 2A and showing an array of optical fibers operably arranged at the front-end section of the support member.
Figure 2C:
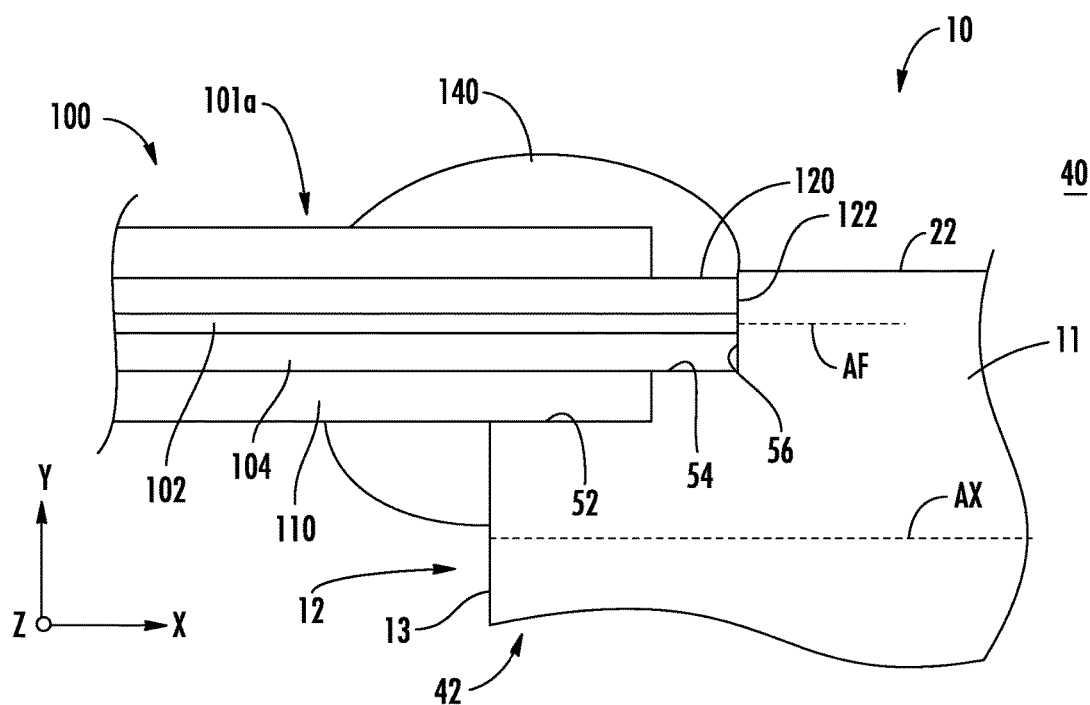
FIG. 2C is a close-up side view of the end portion of the optical fiber, showing how the optical fiber can be supported by the support features formed in the front-end section of the support member.

Once the support member 10 is formed or otherwise obtained and at least one laser-written waveguide 350 formed therein, it is used to form an optical interface device 400, which is introduced and discussed below. FIG. 2B is a top-down view of support member 10 showing a plurality of optical fibers 100 operably disposed on front-end section 42 of support member 10. FIG. 2C is a close-up side view of the optical fiber 100 and front-end section 42 of support member 10. Optical fiber has a first end portion 101a and an opposite send end portion 101b (see FIG. 5, introduced and discussed below).

As best seen in FIG. 2C, each optical fiber 100 includes a core 102 and a cladding 104 that surrounds the core. The core 102 and cladding 104 may be made of glass and are configured to form an optical waveguide, but other suitable materials are possible. The cladding 104 is surrounded by a non-glass coating 110, such as a polymer (e.g., polyurethane acrylate). When a portion of coating 110 is removed ("stripped") from optical fiber 100 at end portion 101a, the result is an exposed glass section 120, which is referred to in the art as a "bare fiber section." Each optical fiber 100 to be interfaced with support member 100 is processed so that it includes a first end portion 101a having bare fiber section 120, which has an end face 122. In the discussion below, reference is sometimes made to a single optical fiber 100 for ease of discussion. The optical fiber 100 has a central axis AF that runs down the center of core 102.

The optical fiber 100 is disposed on front-end section 42 of support member 10, e.g., at optical fiber support feature 50, with its bare fiber section 120 residing on the second step 54 and while the rest of the end portion resides on the first step 52. In this configuration, end face 122 of bare fiber section 120 resides immediately adjacent or in intimate contact with vertical optical fiber stop surface 56 defined by second step 54.

The optical fiber 100 can be secured to front-end section 42 of support member 10 using, for example, an adhesive material 140, such as epoxy. In an example, adhesive material 140 is light curable, e.g., with ultraviolet (UV) light. Other optical fibers 100 can be added to support member 10 in the same manner. In an example, adhesive material 140 is index-matched to the optical fiber 100 and to the bulk refractive index $n_b$ of support member 10 to reduce optical loss.

Figure 3A:
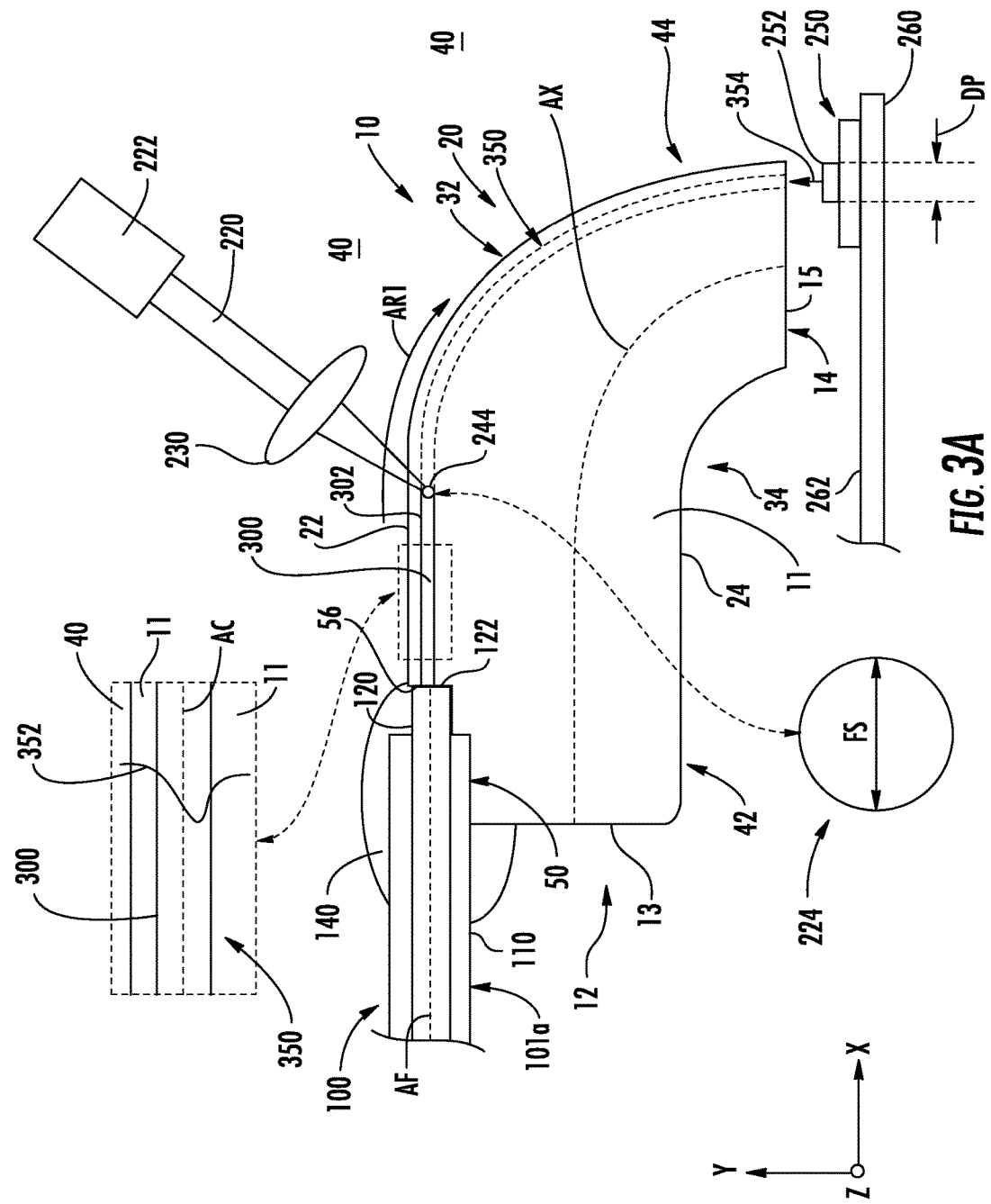
FIG. 3A is a side view similar to FIG. 2A and illustrates an example of forming a core in the body of the support member by laser writing.

Once the desired number of optical fibers 100 are added to support member 10 as described above, the next step involves forming at least one laser-written waveguide 350. This involves forming at least one high-index core ("core") 300 in body 11 of the support member. FIG. 3A is similar to FIG. 2A shows an example of forming core 300 in body 11 of support member 10 by laser writing. The laser writing is accomplished using a laser beam 220 from a laser system 222. In an example, laser beam 220 is brought to a focus 224 (e.g., with a focusing lens 230 such as a microscope objective) within body 11 of support member 10 at a select focus depth relative to top surface 22. The focus spot 224 has a select size FS, e.g., a diameter. The specific wavelength, pulse duration (i.e., pulse width) and pulse energy of laser beam 220 need to form core 300 depends on the particular glass used.

In an example, laser beam 220 is pulsed (e.g., comprises femtosecond pulses) and has sufficient energy at focus spot 224 to locally change the bulk refractive index $n_b$ of body 11 to a core refractive index $n_c$, wherein $n_c > n_b$. By scanning laser beam 220 (as shown by arrow AR1 in FIG. 3A), core 300 is formed within body 11 of support member 10. The dashed-line section of core 300 represents the portion of the core 300 to be formed as the laser beam 220 continues scanning. As discussed below, core 300 can vary in size, shape and position (relative to outer surface 22) along its length. In an example, a refractive index difference $\delta = n_c - n_b$ is between 0.01 and 0.02 (i.e., between 1% and 2%). In another example, $\delta < 0.01$. The refractive index difference $\delta$ can also vary along the length of core 300, as discussed below. In one example discussed below in connection with FIG. 17, the refractive index $\delta = 0$ over a portion of core 300 at bend section 20.

While core 300 is shown in FIG. 3A and in other Figures as having a sharp boundary, this is for ease of illustration. In practice, refractive index of core 300 can vary laterally, i.e., can have a graded index, in which case the "edge" of the core is not well-defined. In such a case, an edge for core 300 can be denoted using any one of a number of criteria, such as the $1/e$ or $1/e^2$ point of the change in refractive index $n_c$ relative to its on-axis value.

Figure 3B:
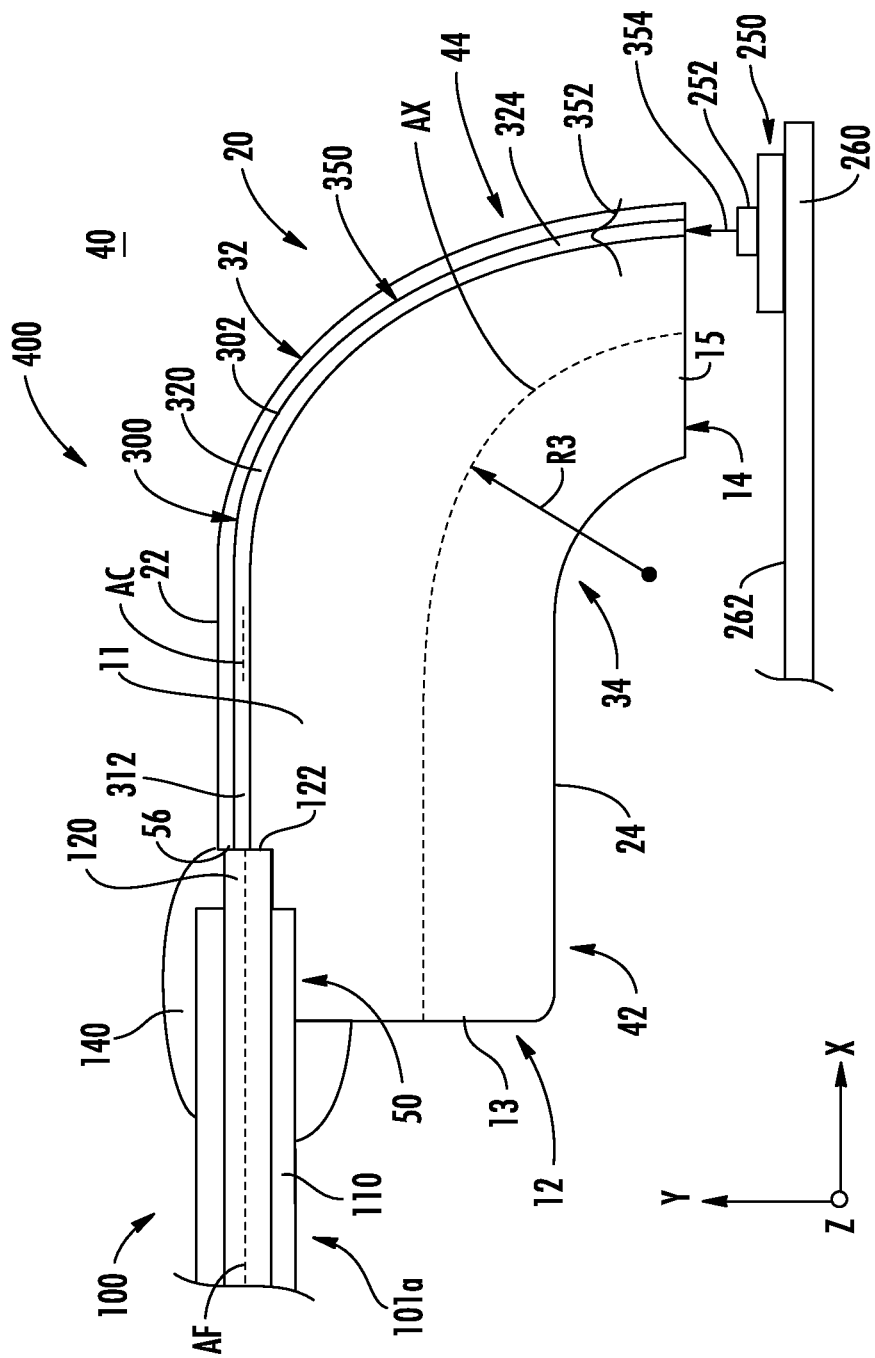
FIG. 3B is similar to FIG. 3A and shows the support member having a completely formed laser-written core, wherein the core defines an optical waveguide within the body of the support member and resides adjacent the outer surface thereof, and wherein the resulting structure defines an optical interface device.

FIG. 3B shows the completed laser-written core 300, which in the example shown extends from optical fiber stop surface 56 to the distal-end planar surface 15. The laser writing of optical waveguides in bulk glass is known in the art and is described in, for example, U.S. Pat. Nos. 6,573,026 and 6,977,137, which are incorporated by reference herein. The core 300 includes a front-end section 312 at front end 42 of support member 10, a curved section 320 at bend section 20 of the support member, and a back-end section 324 at back-end section 44 of the support member. The core 300 can be generally said to be "curved" because is substantially follows the outer curved portion 32 of outer surface 22 of support member 10.

While not wishing to be bound by theory, it is believed that the change in the refractive index Induced in body 11 by the laser writing process that defines core 300 may be caused by a localized densification of the bulk glass or by the generation of color centers. It may be that both of these phenomena occur at the same time to cause the localized refractive index change. In either case, core 300 is formed without having to add material (e.g., a dielectric material, index-changing dopants, etc.) to body 11 because the refractive index change is induced directly into the body by the photons in laser beam 220, wherein the photons are not considered to be "material." Thus, core 300 is formed by a localized change in the refractive index of the material that makes up body 11 so that the body remains monolithic after the formation of core 300. The same is true in the example of the laminated embodiment discussed below, wherein the body 611 of the upper glass sheet 610 remains monolithic after the formation of core 300. In an example, core 300 is thus said to be formed as a locally densified portion of the single glass material that constitutes body 11 or body 611.

FIGS. 3A and 3B include a photonic device 250 disposed adjacent distal-end planar surface 15. The photonic device 250 is operably supported by a PICB 260, introduced and discussed below, and is shown in FIGS. 3A and 3B to illustrate the position of the photonic device when support member 10 is used as an optical interface device 400. The photonic device 250 includes a photoactive element 252, such as a light receiver (e.g., photodetector) or light emitter (e.g., light source). The photoactive element 252 has a dimension (e.g., a diameter) DP. The photonic device 250 is supported by a PCIB 260 having an upper surface 262. Alternatively, photonic device 250 may be a passive photonic device, such as a waveguide grating vertical coupler that is fabricated on the surface of PICB 260.

The configuration of core 300 is defined in part by the location of the end face 122 of optical fiber 100 on vertical wall 56, the size of core 102 and its (y, z) position at the fiber end face, and the (x, z) position of the photoactive element 252 of photonic device 250 at distal-end planar surface 15. Each core 300 has a central axis AC and is formed so that its central axis is aligned with core 102 (i.e., with optical fiber axis AF) and with photonic device 250, and in particular with photoactive surface 252. In an example, both the core 102 of optical fiber 100 and the photonic device 250 reside adjacent the outer surface 22, which allows core 300 to be formed at or immediately adjacent to the outer surface.

The core 300 thus has a bent or curved shape that generally follows the contour of outer surface 22 at least at outer curved portion 32. The core 300 may have a diameter DC that can vary along its length. The core 300 also has an outer edge 302 that resides closest to outer surface 32. The depth of the core central axis AC relative to outer surface 22 is given by $dC_A$, while the depth of the core to the outer edge 302 is given by $dC_E$. The core depths $dC_A$ and $dC_E$ can vary along the length of core 300. In an example, the core depths $dC_A$ and $dC_E$ can be substantially constant in bend section 20.

The core 300 has a cross-sectional area $AR_C$ that can vary along the length of the core. The cross-sectional shape of core 300 can be but need not be circular, and can be oval, oblate, etc. In an example, the core diameter DC substantially matches that of the diameter of the core 102 of optical fiber 100 at optical fiber stop surface 56 (e.g., DC is about 8 to 10 microns) and substantially matches the diameter DP of photoactive element 252 at distal end 14 (e.g., DP is about 20 microns to 60 microns). Consequently, the shape and/or size of the core 300 can be matched to the interfacing component for improved optical coupling.

In an example, the cross-sectional area $AR_C$ of core 300 is greater at bend section 20 than at the proximal and distal ends 12 and 14 of support member 10, e.g., is between about 20% to 500% greater than at proximal end 12.

Thus, in an example, once the (y, z) position of each optical fiber core 102 of optical fibers 100 is established and the (x,z) position of each photonic device 250 is established, the cores 300 are written by scanning laser beam 220, starting for example, from each of the (y, z) positions of optical fiber cores 102 and continuing to the corresponding (x, z) position of the corresponding photonic device 250. In one example, this laser-writing process results in an array of cores 300 that lie substantially in respective x-y planes that have different z positions. In an example, there can be some variation of the cores 300 from residing strictly in respective x-y planes, e.g., when some variation in the pitch of the cores at the proximal and distal ends of support member 10 requires an excursion of the core in the z-direction.

In an example, front-end section 312 of core 300 gradually transitions from the (y, z) location of the optical fiber core 102 up to near outer curved portion 32 of outer surface 22 at bend section 20. Once cores 300 are close to outer surface 22 (e.g., within 10 microns) at bend section 20, the scanning laser beam 220 continues to write cores 300 around the curved portion 32 of outer surface 22 while maintaining a constant core depth $dC_E$ from outer surface 22, thereby forming the curved section 320 of core 200. The laser writing of cores 300 continues from the curved section 320 and forms back-end section 324 that terminates at distal-end planar surface 15. As discussed above, cores 300 have a first pitch at optical fiber stop surface 56 or proximal-end planar surface 12 that may match the optical fiber pitch, and a second pitch at distal-end planar surface 15 that may match the pitch of the photonic devices 250. This configuration aligns cores 300 with optical fibers 100 at the core front-end section 312 and aligns the cores with the photonic devices 250 on PICB at the back-end section 324.

Each core 300 serves to define one of the aforementioned waveguides 350 in body 11 of support member 10. Each waveguide 350 is curved and includes a core 300, with the waveguide cladding defined by the portion of lower-index body 11 that resides adjacent the core, as well as the lower-index air of index $n_a \approx 1$ or a low-index coating 23 of index $n_1$ that resides adjacent upper surface 22. The waveguide 350 in FIG. 3B is shown with a guided light wave ("guide wave") 352 traveling therein in the direction from distal end 14 toward proximal end 12 and formed by light 354 emitted from photoactive element 252 and coupled into the waveguide.

As discussed above, the difference δ between the core refractive index $n_c$ of core 300 and the bulk refractive index $n_b$ of body 11 can be about 1% to about 2%. This index difference generally makes for a weakly guiding waveguide 350. However, by locating core 300 at or adjacent outer surface 22 (e.g., with the core outer edge 302 residing within 10 microns thereof), the low-index coating 23 or the air that resides adjacent the outer surface 22 also constitutes part of the cladding for the waveguide 350. In other words, the propagation of guided wave 352 in waveguide 350 is affected by the proximity to the low-index coating 23 or the air adjacent the outer surface. This creates a relatively large index difference, e.g., about 3% to 1% with respect to the low-index coating refractive index $n_1$ or about 30% to 33% with respect to air. Thus, waveguide 350 is actually a relatively strong waveguide with respect to bend section 20. This allows for the central axis AX of support member 10 at bend section 20 to have a relatively small radius of curvature RB (FIG. 3B), e.g., in the range from 1 mm≤RB≤4 mm.

As noted above, the waveguide core 300 can be substantially circular in cross-section and can have a diameter DC that substantially matches that of the optical fiber core 102 at the front-end section 42 and that substantially matches a diameter of photoactive element 252 at back-end section 44. This allows for waveguide 350 to have substantially matched mode-field diameters at its two ends.

The exact location of outer surface 22 may be determined prior to or during the laser writing of core 300 by using a suitable instrument, such as a scanning laser confocal profilometer, which can determine the surface location with high precision (e.g., 0.1 micron). The core 300 can be written by laser beam 220 so that it is formed slightly below curved portion 32 of outer surface 22 in bend section 20. For example, the core outer edge may be located at a depth $dC_E$ that is 0 to 10 microns below outer surface 22 at bend section 20, or in another embodiment 4 microns to 8 microns below the outer surface.

As noted above, the close proximity of the curved section 320 of core 300 to the curved portion 32 of outer surface 22 creates a relatively large index of refraction difference that provides strong optical confinement, thereby enabling low-loss guiding of guide wave 352 through waveguide 250 at bend section 20, where it follows a small bend radius RB (e.g., 2 mm to 3 mm). A smooth outer surface 22 formed by the high temperature draw process or by subsequent polishing minimizes scattering losses, as can the use of the aforementioned low-index outer coating 23. In an example, the curved section 320 of core 300 is substantially concentric with the curved portion 32 of outer surface 32, i.e., the core depth $dC_A$ is substantially constant over the curved portion 32 of bend section 20 of support member 10.

When multiple optical fibers 100 are employed, multiple cores 300 are formed having a first pitch that matches the pitch of the optical fibers at front-end section 42 and a second pitch that matches the pitch of the photonic devices 250 at back-end section 44. If needed, the cores 300 can be displaced away from outer surface 22 at the back-end section 44 to accommodate in-board locations of photonic devices 250.

Figure 4A:
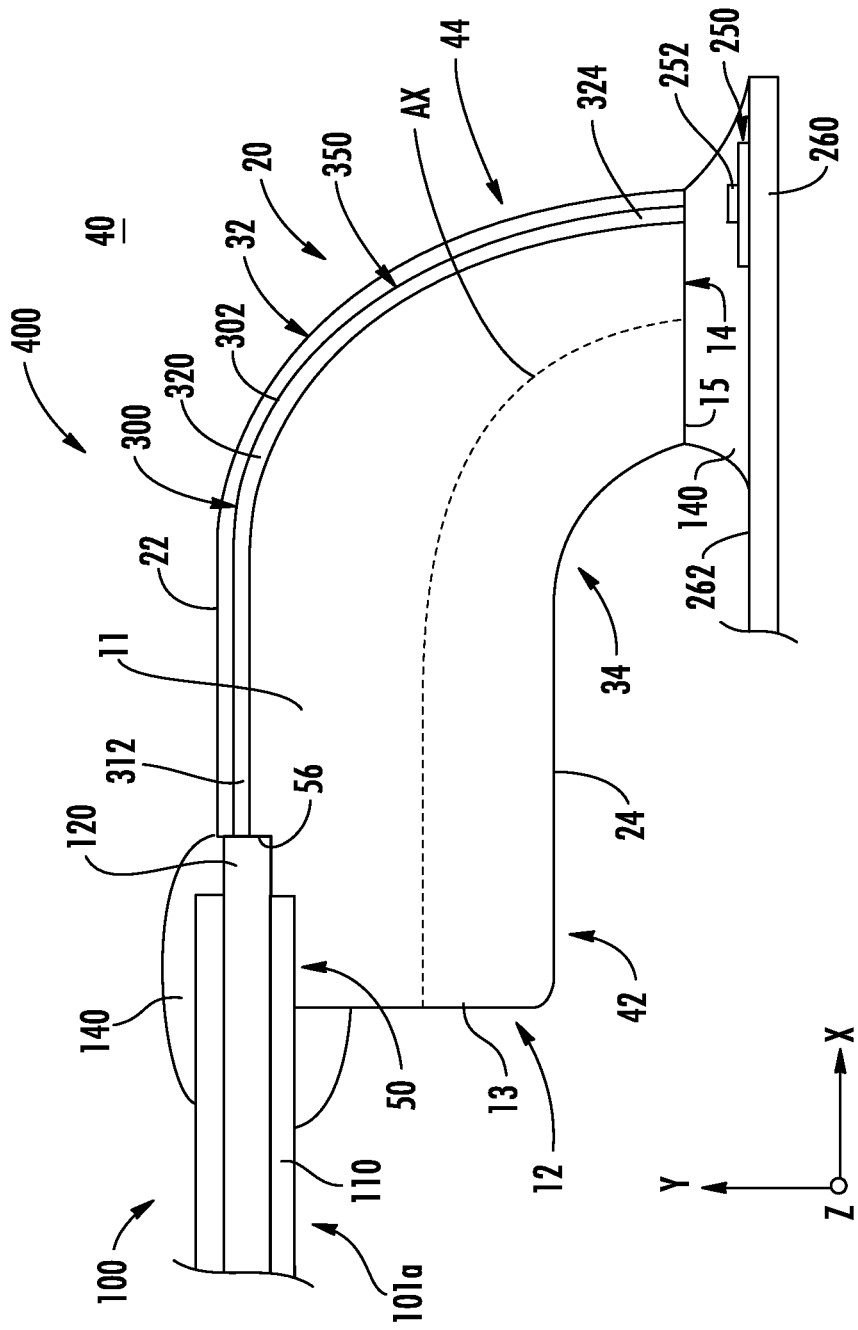
FIG. 4A is similar to FIG. 3B and shows the optical interface device interfaced with a photonic device operably supported by a PICB.

FIG. 4A is similar to FIG. 3B and shows support member 10 with optical fiber 100 operably disposed thereon at front-end section 42, and with waveguide 350 formed therein and operably arranged relative to PICB 250 and photonic device 250 thereon. The support member 10 with waveguide 300 formed therein constitutes an optical interface device 400 that allows light 354 to communicate between optical fiber 100 and photonic device 250. As shown in FIG. 2B, multiple optical fibers 100 can be so arranged at front-end section 42 of support member 10.

Figure 4B:
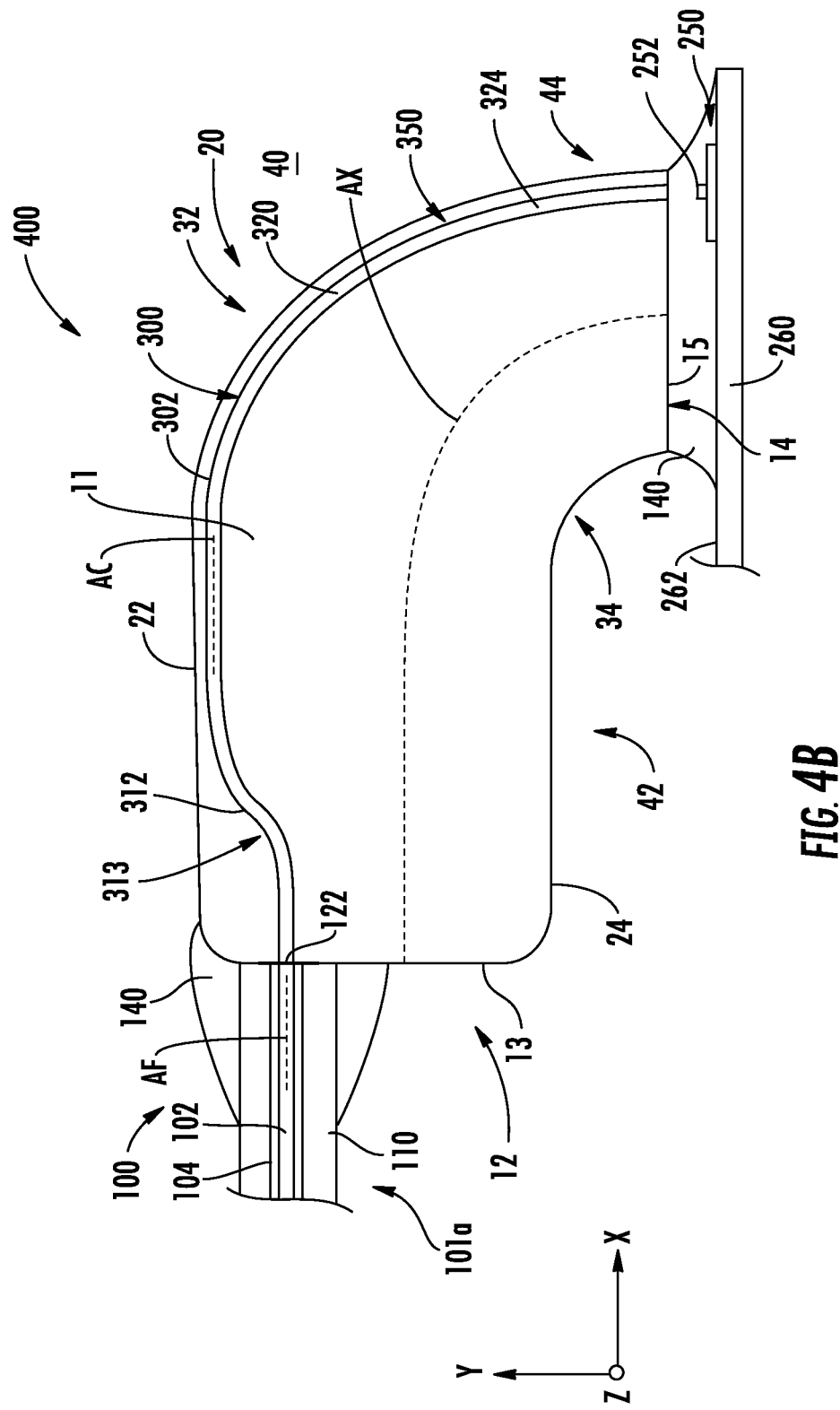
FIG. 4B is similar to FIG. 4A, except that the optical fiber is attached directly to the planar surface at the front-end section rather than using the support features of FIG. 4A, and wherein the core includes a front-end section that curves to accommodate the optical fiber location.

FIG. 4B is similar to FIG. 4A and illustrates another embodiment of support member 10 wherein the support member does not include optical fiber support feature 50. Instead, the optical fiber(s) 100 is/are directly connected to planar surface 13 at proximal end 12 using for example, adhesive material 140, which also provides for strain relief. Note that front section 312 of core 300 includes an offset 313, which in an example is a gradual (i.e., adiabatic) bend that brings the core from near the outer surface 22 deeper into the body 11 in order to align with core 102 of optical fiber 100. A sufficiently gradual (adiabatic) bend in offset 313 allows for the guide wave 352 to continue to propagate through waveguide 350 without substantial loss.

With continuing reference to FIG. 4B, optical interface device 400 is aligned with photonic integrated devices 250 supported by PICB 260 and then attached to the PICB using, for example, adhesive material 140.

Figure 5:
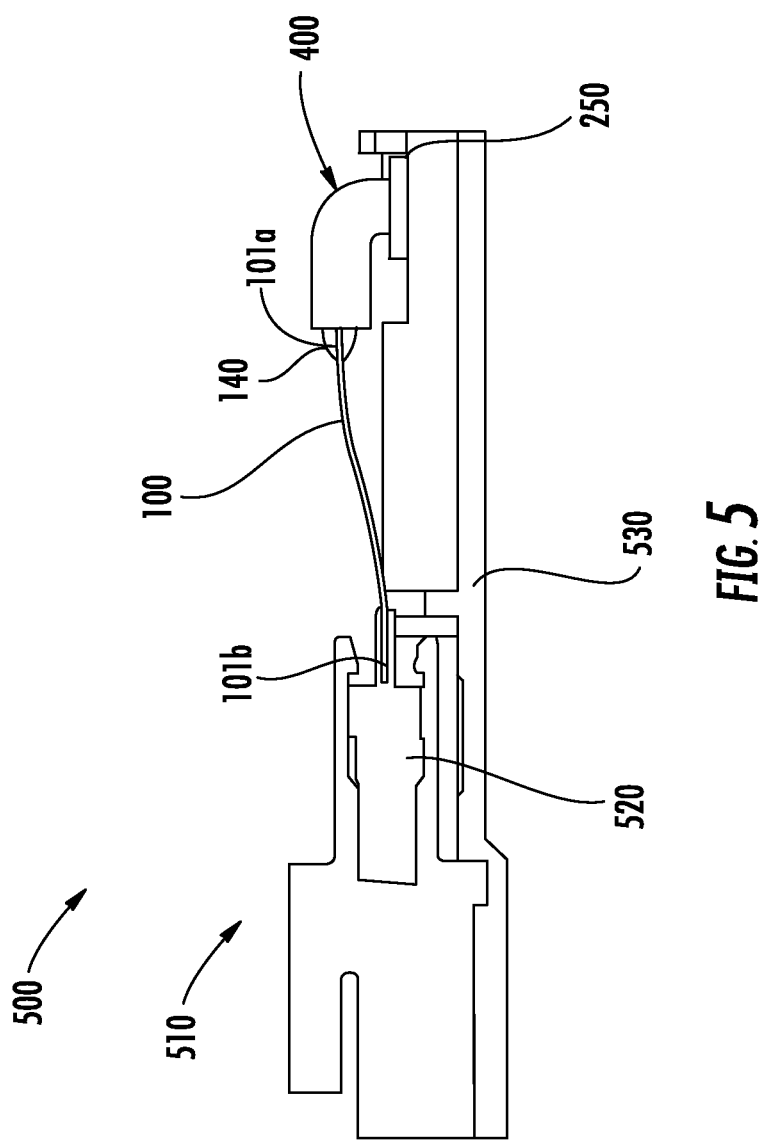
FIG. 5 is a side view of an example photonic device assembly that includes a PICB optically coupled to an optical interface device via the optical interface device of FIG. 4B.

FIG. 5 is a side view of an example photonic device assembly 500 that includes PICB 260 optically coupled to an optical device 510 via the optical interface device of FIG. 4B. The optical device 510 includes an optical fiber connector 520 configured to receive respective second ends 101b of optical fibers 100. The photonic device assembly 500 includes a package 530, such as a quad small-form-factor pluggable (QSFP) package.

Figure 6A:
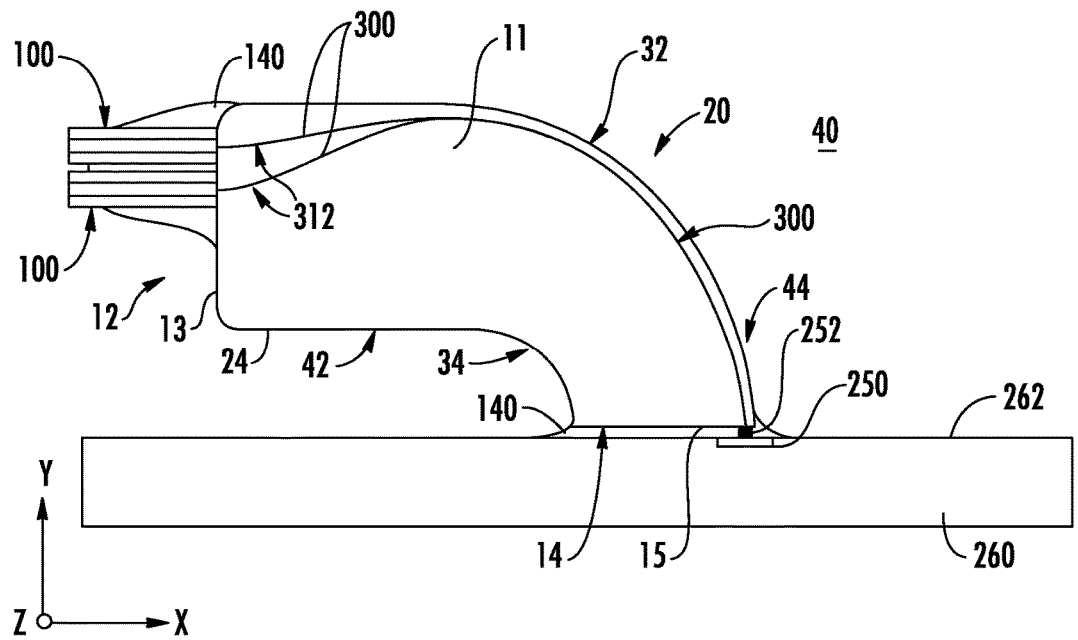
FIG. 6A is similar to FIG. 4B and illustrates an example of an optical interface device that includes a 2D optical fiber array, with two optical fibers being optically coupled to respective photonic devices via corresponding cores formed in the support member.

FIG. 6A is similar to FIG. 4B and illustrates an example optical interface device 400, wherein the optical fibers 100 are arranged in a 2D array at proximal-end planar surface 13 of front-end section 42, with the 2D array having a top row 100T and a bottom row 100B. In FIG. 6A, cores 300 are formed to connect to each of the optical fibers 100 by including core paths within front-end section 312 of core 300 that extend deep into body 11 of support member 10 to reach the bottom row 100B of optical fibers. The cores 300 for a given pair of optical fibers 100T and 100B (i.e., with the same z-coordinate but different y-coordinate) diverge in the z-coordinate direction to be spaced by a fixed pitch (e.g., 125 microns) as they ultimate converge to share the same offset distance from the smooth glass curved surface, with one core residing "behind" to other in FIG. 6A. The pair of cores 300 travel in parallel adjacent outer surface 22 around the bend section and down to distal-end planar surface 15 and to respective photonic devices 250 with different z-locations, or to a single photonic device.

Figure 6B:
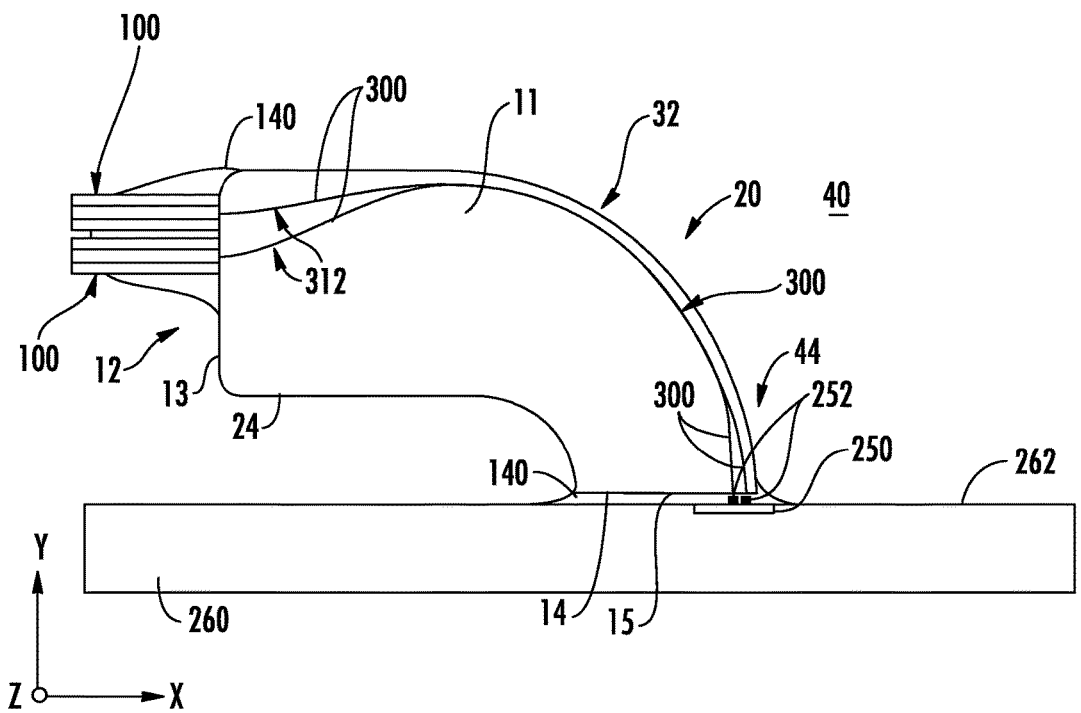
FIG. 6B is similar to FIG. 6A and illustrates an example of an optical interface device wherein pairs of optical fibers in the 2D optical fiber array are optically coupled to respective pairs of photonic devices on the PICB via a corresponding pair of cores formed in the support member.

FIG. 6B is similar to FIG. 6A and shows a 2D array of photonic devices 250 on PICB 260 along with the 2D array of optical fibers 100. In FIG. 6B, the cores 300 associated with a given pair of optical fibers with the same z-coordinate but different y-coordinate respectively optically couple to photonic devices 250 having the same z-coordinate but different x-coordinate. Here, the paths of the cores 300 simultaneously experience convergence of their y-coordinates while their z-coordinates diverge, so that they reside close together at constant pitch adjacent to outer surface 22 as they travel around bend section 20 in parallel and then diverge again in back-end section 324 to align with respective photoactive elements 252 on one or more photonic devices 250 on PICB 260.

Laminated Embodiment

Figure 7A:
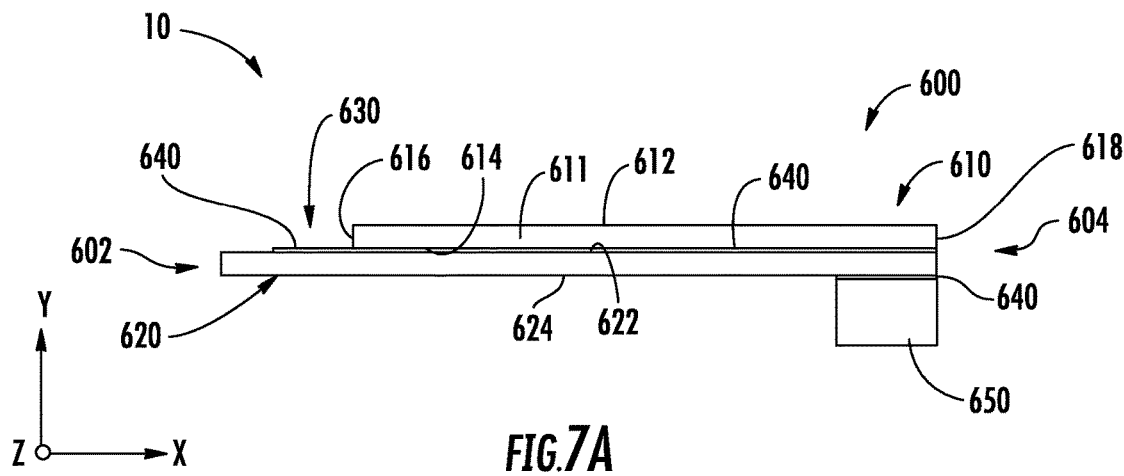
FIGS. 7A through 7D are side views of an example laminated structure used to form an optical interface device that includes a curved waveguide, with FIG. 7C showing a core being laser written into an upper glass sheet before bending and FIG. 7D showing the final optical interface device structure after bending.

FIGS. 7A through 7D are side views of an example support member 10 defined by a laminated structure 600. With reference first to FIG. 7A, the laminated structure 600 includes a front or proximal end 602, a back or distal end 604 and upper and lower thin glass sheets 610 and 620 that sandwich an uncured adhesive material 640 that is, for example curable using ultraviolet light. The upper glass sheet 610 includes a body 611 with top and bottom surfaces 612 and 614, a front edge 616 and a back edge 618. The lower glass sheet 620 has top and bottom surfaces 622 and 624. The top surface 612 of upper glass sheet 610 is also referred to as an outer surface. In an example, the upper glass sheet 610 is shorter in the x-direction than the lower glass sheet 620. The laminated structure 600 includes a support block 650 attached (e.g., via an adhesive 640) to the bottom surface 624 of lower glass sheet 620 adjacent back end 604.

Figure 7B:
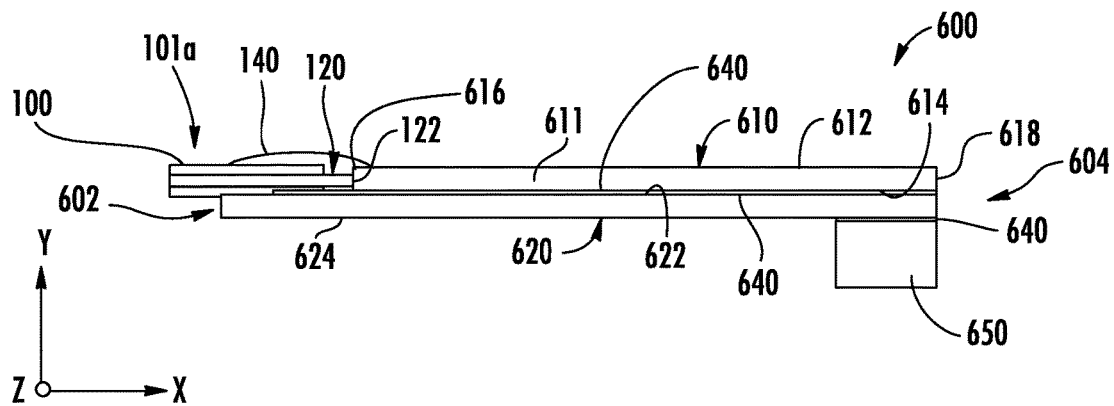

The difference in size of the upper and lower glass sheets 610 and 620 defines a ledge 630 at the front end 602 of laminated structure 600. The edge 616 of upper glass sheet 610 defines a fiber stop surface. With reference now to FIG. 7B, a first end 101a of optical fiber 100, which includes a bare fiber section 120, is disposed on ledge 630 and fixed thereto, e.g., via adhesive material 140. The end face 122 of bare fiber section 120 resides immediately adjacent edge or fiber stop surface 616. Here, adhesive material 140 can be UV-curable or thermally curable. If UV-curable, shielding can be used to avoid curing the sandwiched adhesive material 640, which in an example can be the same as adhesive material 140.

Figure 7C:
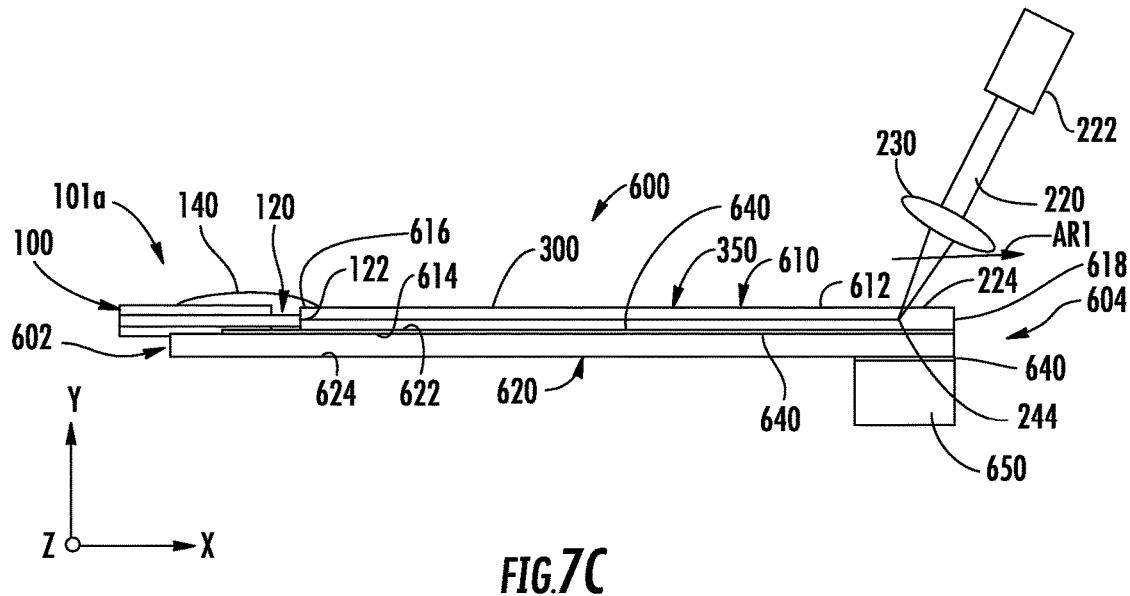
Figure 7D:
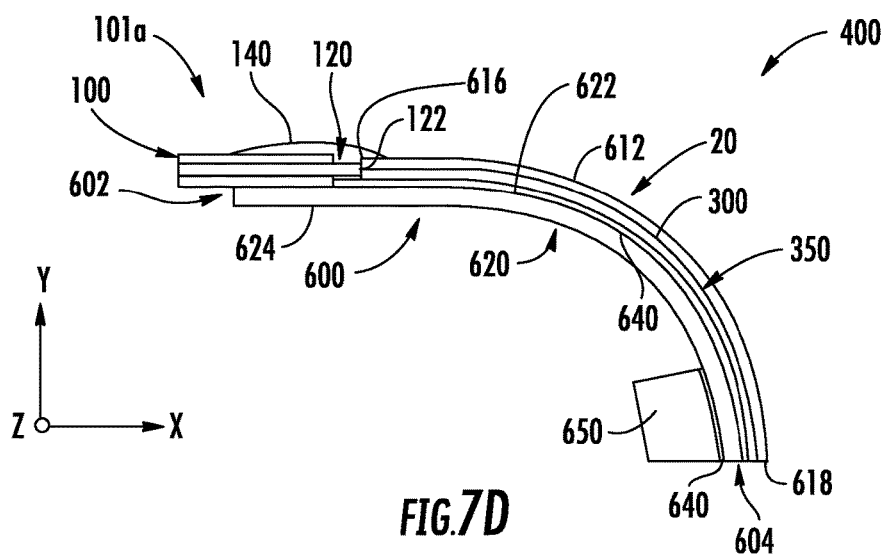

FIG. 7C is similar to FIG. 7B, except that it shows laser beam 220 being scanned over laminated structure 600 so that focus spot 224 forms core 300 in body 611 of upper glass sheet 610. The core 300 is formed close to or at outer surface 612 of upper glass sheet 610 and can include front section 312 having an offset 313 wherein the core gently transitions deeper into body 611 of the upper glass sheet so that it aligns with optical fiber core 102 at edge 616. Multiple cores 300 can be formed in the same manner and with a first pitch at front edge 616 to match that of optical fibers 100 and a second pitch at back edge 618 to match the anticipated locations of multiple photonic devices on PICB 260. As with the above embodiment that employed the monolithic support member 10, the (y, z) positions of optical fiber cores 102 at edge 616 can be established using known techniques and devices, such as a vision system.

In an example, the upper and lower glass sheets 610 and 620 are made of a flexible glass, such as Corning® Willow® glass. Other chemically strengthened, flexible glasses can also be used. In an example, the upper and lower glass sheets 610 and 620 have a coefficient of thermal expansion (CTE) that is closely matched to silicon. In an example, the upper and lower glass sheets 610 and 620 have a thickness in the range of 40 microns to 60 microns. Such thin glass sheets can be cut into rectangular shapes via mechanical or laser cleaving operations. Alternatively, such thin glass sheets can be formed by a glass drawing process. The uncured adhesive 640 helps hold the upper and lower glass sheets 610 and 620 together during assembly.

Figure 8A:
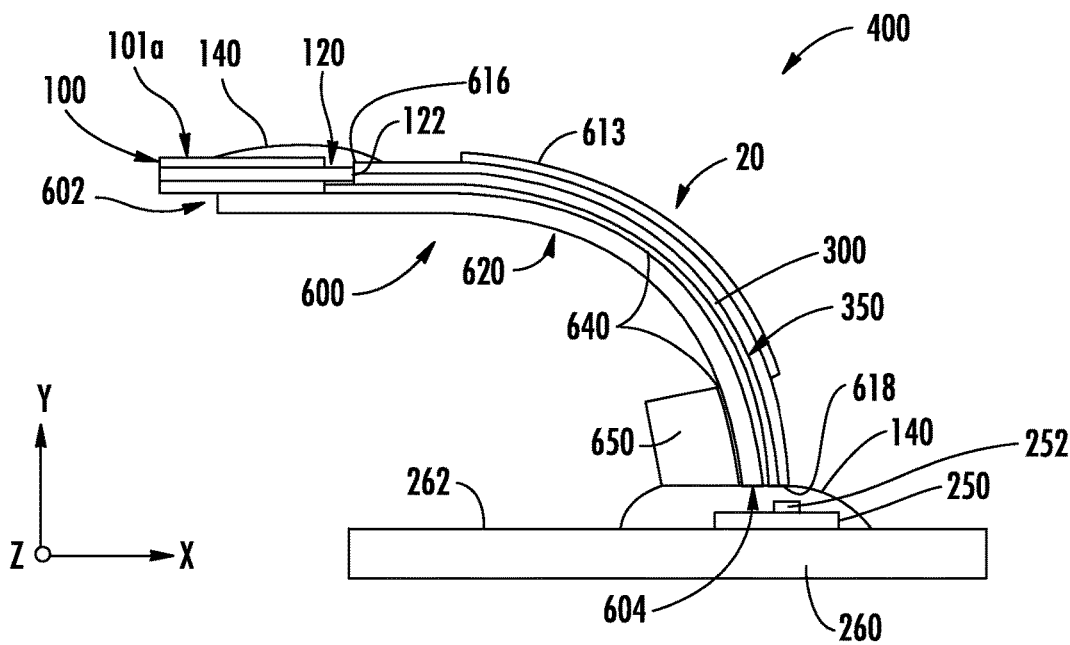
FIG. 8A is a side view of an example laminated optical interface device operably interfaced with an optical fiber and with a photonic device supported by a PICB.

The cores 300 define waveguides 350, wherein a portion of body 611 of top glass sheet 610 defines a portion of the cladding and wherein the air or a low-index coating 613 that resides adjacent top or outer surface 612 defines a portion of the cladding (see FIG. 8A).

In another embodiment, at least a portion of cores 300 can be formed prior to attaching optical fibers 100. In this case, the laser writing process can be used to form front-end section 312 so that an optical interconnection is made between the optical fiber cores and the previously fabricated waveguides.

If the laser writing process for forming cores 300 would inadvertently cure the uncured adhesive material 640 sandwiched between upper and lower glass sheets 610 and 620, it may be necessary to alter the assembly order so that the uncured adhesive is applied after the formation of the cores. In this case, optical fibers 100 can be directly attached to the upper glass sheet 610 prior forming the cores 300 by laser scanning and optionally mechanically stabilizing the structure, e.g., by an additional glass cover sheet (not shown). Then after cores 300 are formed by scanning laser beam 220, the lower glass sheet 620 is attached to upper glass sheet 610 using uncured curable adhesive 640.

Once optical fibers 100 are operably disposed on laminated structure 600 and cores 300 are formed in body 611 of upper glass sheet 610, the upper and lower glass sheets are bent. The bending can be performed in any one of a number of different ways, including by using a jig that supports the laminated structure and that allows the structure to be placed in and then held in a bent position.

After bending laminated structure 600, the curable adhesive 640 is cured, e.g., by illuminating with light of the curing (actinic) wavelength, such as a UV wavelength. This curing locks the upper and lower glass sheets 610 and 620 into a desired curved shape that includes bend section 20. At this point, bottom edge 618 can be polished to provide a flat optical interface for coupling to photonic devices 250 on PICB 260. In addition, low-index coating 613 can be added to top surface 612 of upper glass sheet 610.

FIG. 8A is a side view of an example laminated optical interface device 400 formed by laminated structure 600 described above, wherein the optical interface device is operably coupled to optical fiber 100 at front end 602 and to photonic device 250 on PICB 260 at back end 604. The embodiment of laminated structure 600 includes low-index coating 613 over a portion of top surface 622 at bend section 320.

Figure 8B:
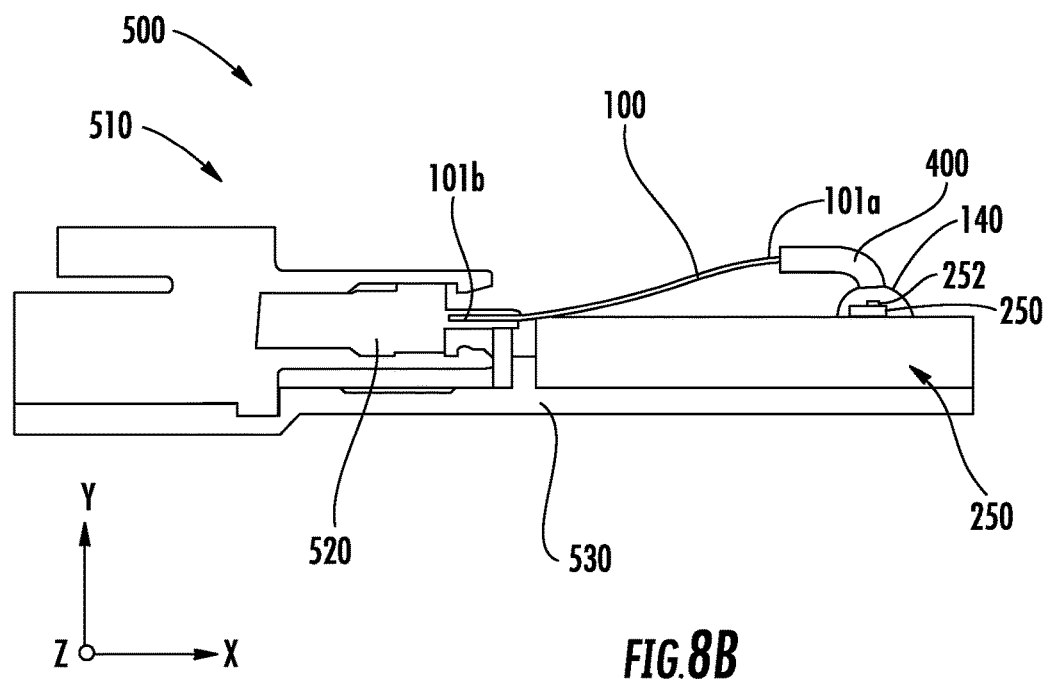
FIG. 8B is similar to FIG. 5 and is a side view of an example photonic device assembly that includes a PICB optically coupled to an optical device via the laminated optical interface of FIG. 8A.

FIG. 8B is similar to FIG. 5 and is a side view of an example photonic device assembly 500 that includes PICB 260 optically coupled to an optical device 510 via the example laminated optical interface device 400 of FIG. 8A. The optical device 510 includes an optical fiber connector 520 configured to receive respective second ends 101b of optical fibers 100. The photonic device assembly 500 includes a package 530, such as a quad small-form-factor pluggable (QSFP) package.

Laser Writing Process Considerations

The embodiments described herein utilize laser writing for creating localized refractive index changes in glass to create a curved waveguide in the support member. This process can also induce stresses that lead to surface damage when the cores are located at or near the glass surface, especially at high laser powers.

In an example, the laser writing of waveguides very close (e.g., within 10 microns) of the glass surface is done with relatively low power to avoid inducing surface damage. However, this results in a low waveguide index contrast. This is normally undesirable in optical interconnections because it makes the waveguides highly sensitive to bend losses. To avoid bend losses, bend radii must be increased, resulting in large and often impractically sized devices.

For low-profile optical interconnection applications as discussed herein, the optical waveguide only requires strong confinement in the out-of-plane direction (i.e., moving towards the outside of the bend). As the optical waveguide traverses the glass bend, it experiences little or no bending in the lateral direction parallel to the axis of the curve. Consequently, extremely weakly guiding and expanded beam solutions in the lateral direction are acceptable for low-loss light propagation around the bend section.

Standard single-mode SMF-28 waveguides employ a step-index core with a core relative refractive index $\Delta = 0.36\%$. The resulting guiding condition is relatively weak, since a significant fraction of the optical field exists as an evanescent wave outside the core region. By reducing the relative refractive index further, the waveguide can be made extremely weakly guiding. In this case, the width of the guided wave increases as the optical field extends even farther beyond the core as an evanescent wave. The width of the optical fiber core can also be increased if necessary without introducing higher order guided modes. As long as the core diameter increases and decreases are performed gradually, light will remain only in the fundamental mode of the guided even if higher order modes are supported by the waveguide.

A modest core diameter increase may be desirable to reduce core/cladding index perturbation losses at the core/cladding interface. In this case, increasing the core diameter reduces the field intensity at the core/cladding interface, which in turn reduces the field overlap with index profile perturbations that would otherwise increase optical loss via scattering.

A small bend in the optical waveguide is equivalent to application of a minor tilt to the index profile. If the core region relative refractive index $\Delta$ is small enough, the large portion of light guided in the core can "spill over" into the cladding exciting a large number of cladding modes. These guided cladding modes can have very low overlap with the original unbent core mode, constituting an undesirable optical loss out of the guided core region. To avoid loss and the related effective tilting of the refractive index profile, optical waveguides that are extremely weakly guided (e.g., with an index difference <0.1%) need to remain straight in the plane of the weakly guiding index contrast.

Figure 9:
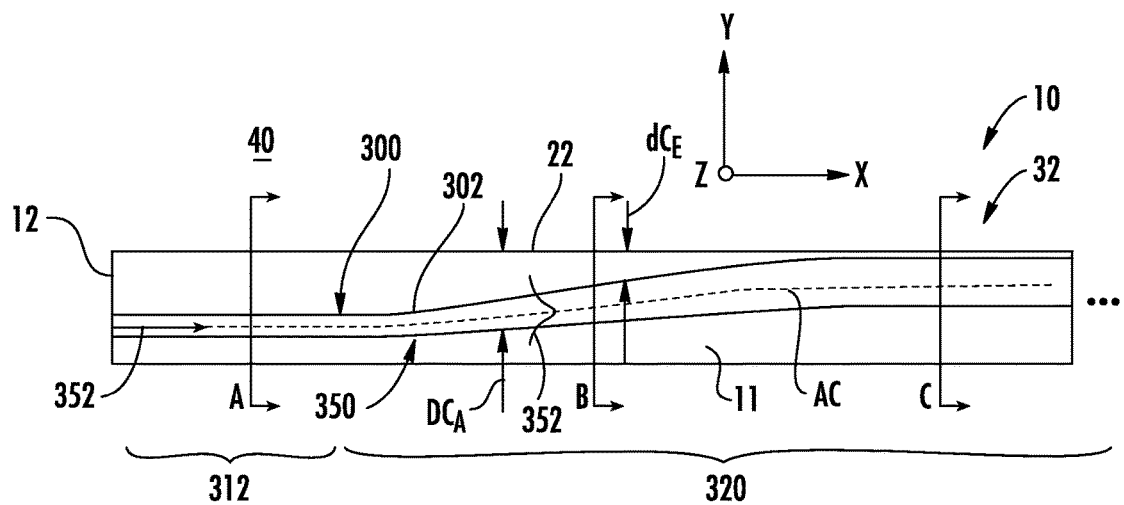
FIG. 9 is a schematic side view in the x-y plane of a laser-written waveguide formed in a glass support member, which is shown as extending uncurved in the x-direction for ease of illustration, and wherein the core of the laser-written waveguide is shown extending from the proximal-end planar surface to the bend section and varies in size, shape and location along its length.
Figures 10A, 10B, 10C:
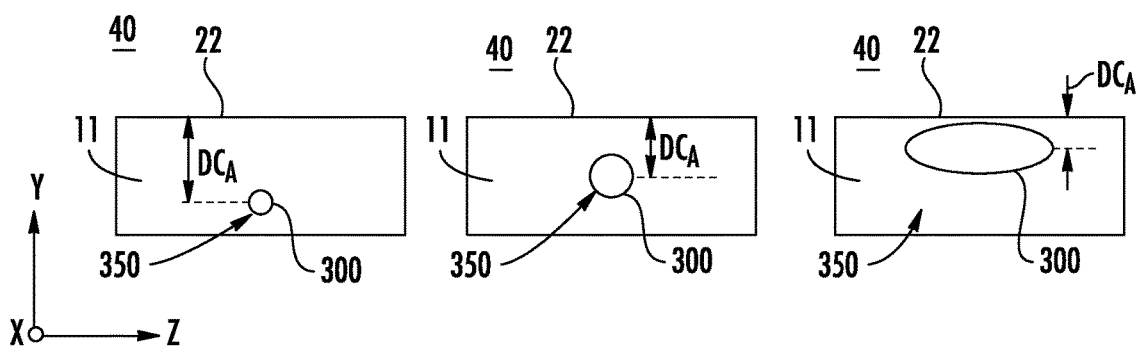
FIGS. 10A, 10B and 10C are y-z cross-sectional views of the glass support member taken at various section locations A, B and C shown in FIG. 9, illustrating how the core may vary in size, shape and location along its length.

FIG. 9 is a schematic side view in the x-y plane of a laser-written core 300 that defines waveguide 350 formed in glass support member 10, which is shown as extending uncurved in the x-direction only (i.e., without showing the bend) for ease of illustration. FIGS. 10A, 10B and 10C are y-z cross-sectional views of the glass support member taken at various locations A, B and C shown in FIG. 9. Though the discussion below is directed to the monolithic example of support member 10, the discussion applies equally to the laminated example of support member 10.

The cross-sectional view of FIG. 10A taken at location A is for the straight front-end section 312 of core 300 of waveguide 350, which is weakly guiding. In front-end section 312, core 300 has a relatively large core depth $dC_A$. The core depth $dC_A$ of core 300 may be selected to ensure proper alignment to core 102 of optical fiber 100, as discussed above. For example, if bare fiber section 120 of an SMF-28 optical fiber 100 is attached directly to the proximal-end planar surface 13 of support member 10, the central axis AX of core 300 can be located relative far below upper surface 22 in front-end section 312, e.g., with a core depth $dC_A$ between 50 microns and 100 microns. If a glass alignment block or other strain relief fixture is attached to the array of optical fibers 100 where it interfaces with support member 10, core 300 can be located even deeper within the body 11 of the support member at front-end section 312, e.g., with a core depth $dC_A$ between 300 to 500 microns from upper surface 22.

With reference again to FIG. 9 and to FIGS. 10A through 10C, core 300 is formed so that is gradually widens and moves towards upper surface 22 as it approaches bend section 20, so that the core depth $dC_A$ decreases. Further, the intensity of laser beam 220 is reduced during the writing of core 300 so that the core refractive index $n_c$ decreases towards bend section 20. Core 300 may also be made wider in the direction parallel to the outside surface of the bend, i.e., in the z-direction.

As core 300 continues into bend section 20, the core depth $dC_A$ decreases even further so that waveguide 350 resides immediately adjacent upper surface 22 and becomes extremely weakly guiding (FIG. 10C). The transition of the size, shape and position of core 300 shown in FIGS. 8A through 8C can take place over a relatively short distance, such as 300 to 400 microns. The guided mode 352 traveling in bend section 20 will be displaced upward (i.e., in the y-direction) toward upper surface 22, with strong confinement provided in this direction by the relatively large difference between the refractive index $n_c$ of core 300 and that of the air (or low-index coating 23) above and which defines a substantial portion of the cladding of waveguide 350 in the y-direction on the upper side of the waveguide.

The strength of the optical confinement of waveguide 350 at bend section 20 may be moderated by using the aforementioned low-index coating 23, such as a polymer optical coating. In an example, the index of refraction $n_1$ of low-index coating 23 is $1<n_1<n_b$, where $n_b$ is the bulk refractive index of body 11 of support member 10, while the refractive index of air is taken to be 1, as noted above. The low-index coating 23 can be used to protect the upper surface 22 of support member 10 from damage and/or contamination that might lead to scattering losses. The low-index coating layer 23 can also reduce the optical scattering loss in bend section 20.

Figures 11A, 11B:
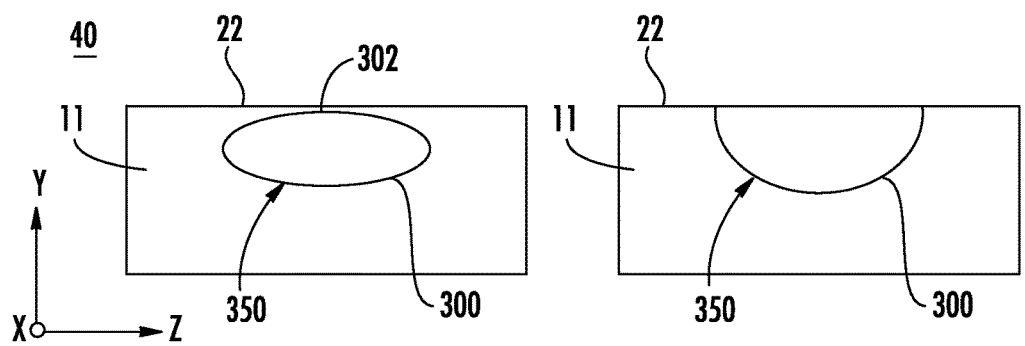
FIGS. 11A and 11B are cross-sectional views similar to FIG. 10C and show two embodiments wherein the outer edge of the core resides just below the upper surface of the support member at the bend section (FIG. 11A), and wherein the core intersects the upper surface at the bend section (FIG. 11B)

FIGS. 11A and 11B are cross-sectional views similar to FIG. 10C and show two embodiments wherein the outer edge 302 of core 300 resides just below upper surface 22 of support member 10 at bend section 20 (FIG. 11A), and wherein the core intersects the upper surface (FIG. 11B) at the bend section. It may be desirable to form core 300 as shown in FIG. 11B to minimize tensile stresses and associated damage at the upper surface 22.

Figure 12:
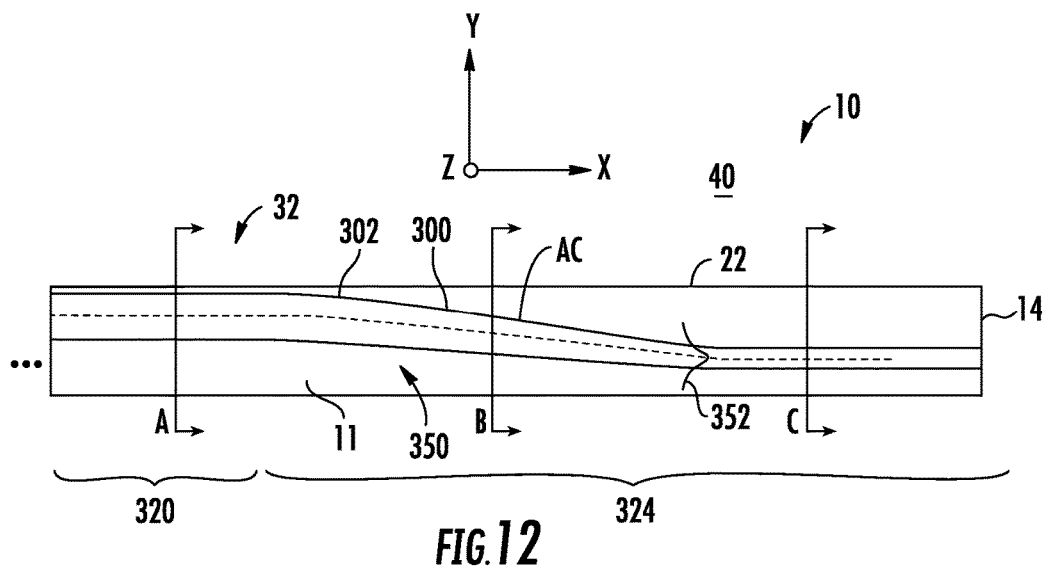
FIG. 12 is similar to FIG. 9 and shows an example transition of the core from the bend section to the distal-end planar surface.
Figure 13A:
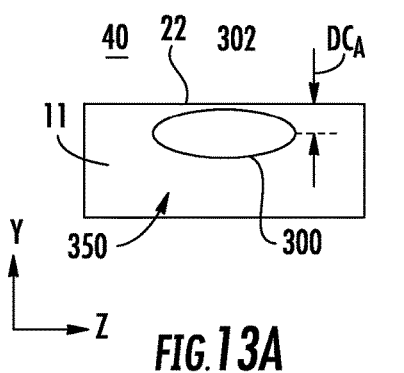
FIGS. 13A through 13C are similar to FIGS. 10A through 10C, and are y-z cross-sectional views of the glass support member taken at various section locations A, B and C shown in FIG. 12, illustrating how the core varies in size, shape and location along its length.
Figure 13B:
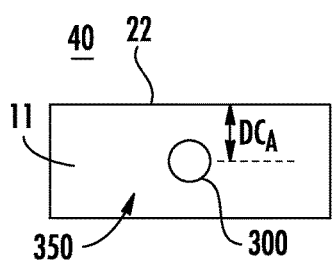
Figure 13C:
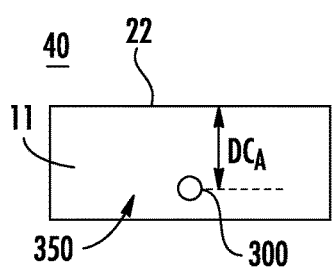

FIG. 12 is similar to FIG. 9, and FIGS. 13A through 12C are similar to FIGS. 10A through 10C, and show an example of the transition of core 300 from bend section 20 to distal-end planar surface 15. The transition shown is substantially the reverse of that from proximal-end planar surface 14 to bend section 20.

Figure 14:
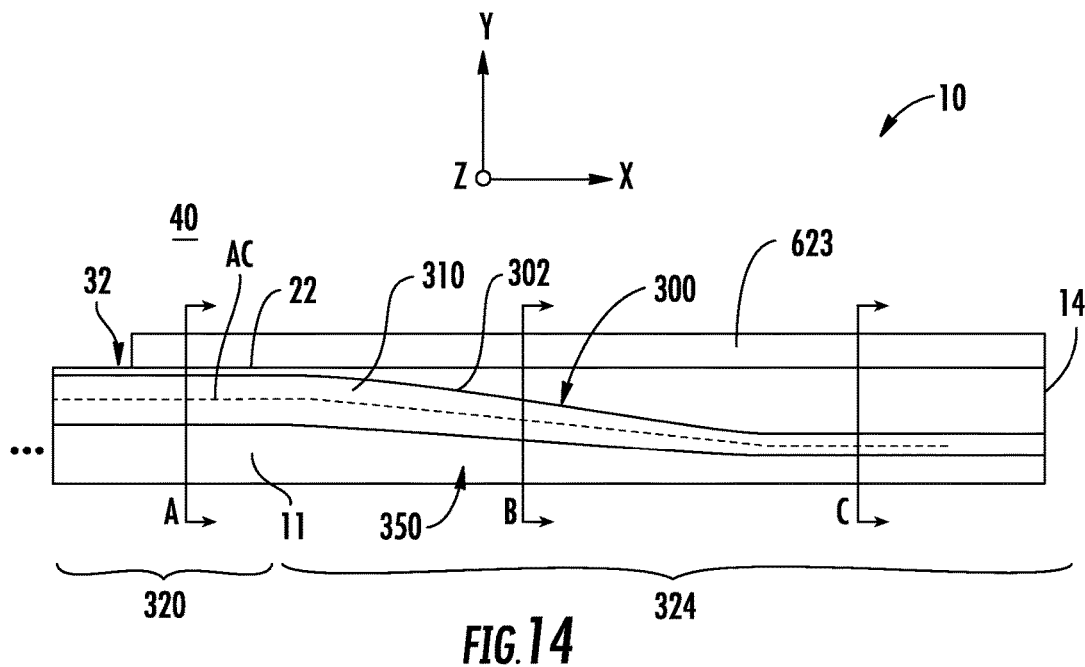
FIG. 14 is similar to FIG. 12, and illustrates an example that includes an overclad layer on the upper surface.
Figures 15A, 15B, 15C:
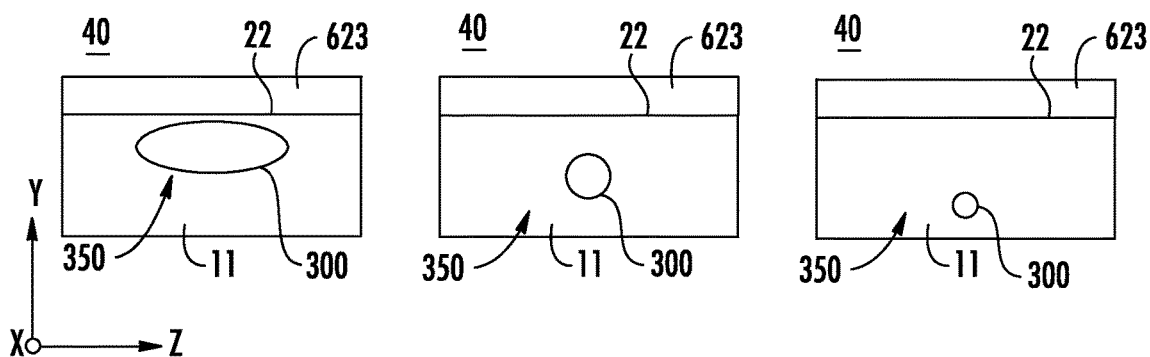
FIGS. 15A through 15C are cross-sectional views of the waveguide similar to FIGS. 13A through 13C taken at various section locations A, B, and C shown in FIG. 14, and show the added overclad layer.

FIG. 14 is similar to FIG. 12, and FIGS. 15A through 15C are similar to FIGS. 13A through 12C, and show the addition of an overclad layer 623 on upper surface 22 between distal end 14 and bend section 20 where core 300 is generally straight. The overclad layer 623 is designed to aid the transition from surface to deeper optical propagation of guided mode 352. The overclad layer 623 has an index of refraction $n_2$ that is more closely matched to the index of refraction $n_b$ of support member 10 than the low-index coating 613. The overclad layer 623 reduces the depth $dC_A$ that core 300 must descend into body 11 to avoid the influence of the surface confinement. By reducing the required core depth $dC_A$, the length of the transition region of back-end section 324 after bend section 20 can be reduced, thereby reducing the overall height of the optical interconnection. The overclad layer 623 can be used in conjunction with low-index coatings 23 or 613, with the low-index coating disposed atop the overclad layer.

If the laser writing process can create optical waveguides with a higher index of refraction near the surface of the glass, it may not be necessary to transition to a deeper optical waveguide with higher relative refractive index Δ for efficient coupling to small diameter active optical devices. Alternatively, if the active optical device requires a larger diameter interface (e.g., for an optical grating coupler interface that provides lateral misalignment tolerance), it may be desirable to utilize a larger diameter and extremely weakly guiding optical waveguide for the interface. In this case, the need for an optical waveguide taper structure may not be required, or it may be foreshortened to reduce the length of the straight section, and therefore the overall height of the optical interconnection.

Figure 16A:
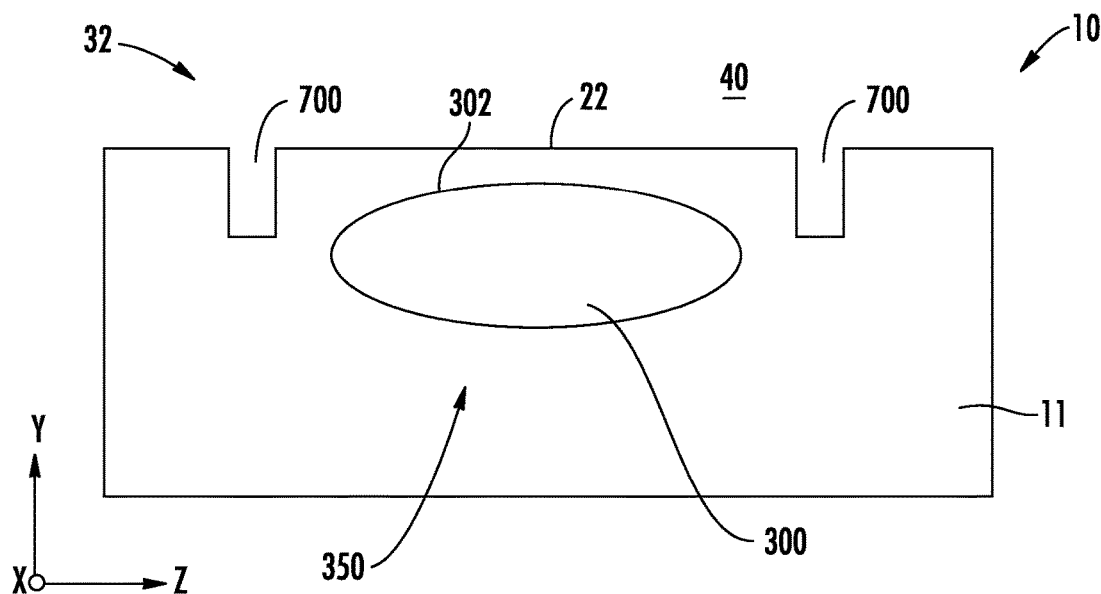
FIG. 16A is a cross-sectional view of an example core in the bend section of the support member, showing an example embodiment wherein a ridge waveguide structure is formed by adding parallel grooves in the upper surface and at the sides of the core.

FIG. 16A is a cross-sectional view of an example core 300 in bend section 20 of support member 10 showing an example embodiment wherein a ridge waveguide structure is formed by adding parallel grooves 700 in upper surface 22 and at the sides of the core. The grooves 700 can be configured to provide strong lateral confinement for the optical waveguide 350 the guided wave 352 propagates in bend section 20. The parallel grooves 700 can be laser written, e.g., using laser beam 220 with relatively high optical power. In bend section 20, the guided wave 352 is biased upwards towards the air-glass interface, so that additional out-of-plane refractive index confinement is necessary moving into the substrate. The grooves 700 prevent guided mode 352 from diffracting laterally, i.e., parallel to the plane of the glass surface, by providing a large refractive index contrast at the groove surface.

Figure 16B:
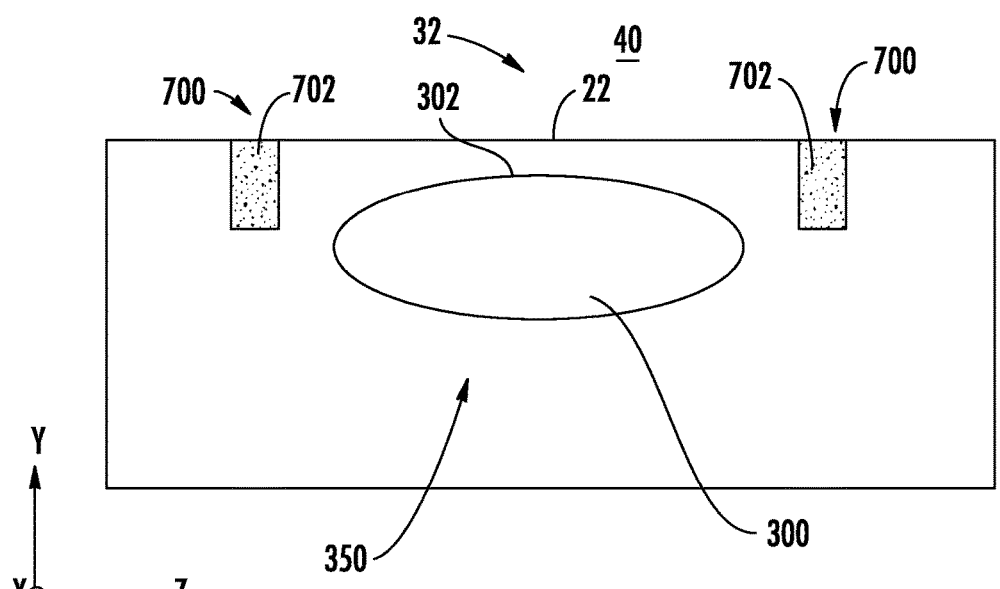
FIG. 16B is similar to FIG. 16A, and shows a dielectric material filling the grooves.

FIG. 16B is similar to FIG. 16A and illustrates an example wherein grooves 700 can be filled with a dielectric material 702 that is closely matched but has a refractive index $n_3$ that is lower than the bulk refractive index $n_b$ of support member 10 for weak guiding of light in and potentially single-mode operation. Alternatively, the grooves 700 can be left unfilled as shown in FIG. 16A, especially if their walls are sufficiently smooth. If the walls of grooves 700 are not sufficiently smooth after laser fabrication, they can be smoothed thereafter, e.g., by exposure to an acid etch. Smooth walls for grooves 700 may also be obtained by locally damaging the glass, followed by exposure to an acid that preferentially etches regions that have experienced laser damage.

Lateral confinement in the bent substrate region may also be achieved by selectively applying the aforementioned overclad layer 623 on upper surface 22 at bend 20. For example, a narrow overclad layer may 623 be applied and lithographically patterned after laser writing and prior to glass substrate bending if such is required.

Figure 17:
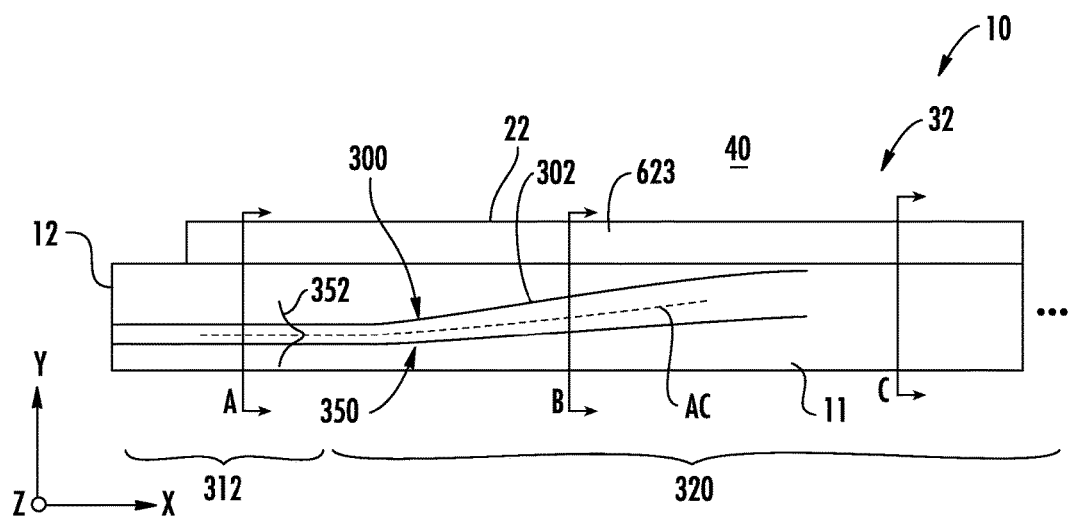
FIG. 17 is similar to FIG. 9 and illustrates an example where the core has a refractive index that gradually decreases at the transition to the bend section so that the waveguide at the bend section has no core and is defined by the overclad layer and the body of the support member.
Figures 18A, 18B, 18C:
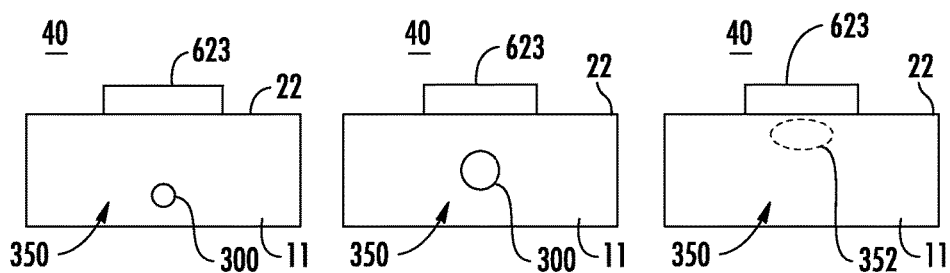
FIGS. 18A through 18C are y-z cross-sectional views of the glass support member taken at various locations A, B and C in FIG. 17, showing how the core changes in size and position (FIGS. 18A, 18B) and ultimately disappears at the bend section (FIG. 18C)

FIG. 17 is similar to FIG. 9 and FIGS. 18A through 18C are similar to FIGS. 10A through 10C and show respective cross-sectional views of an example support substrate 10 for the portion from proximal end 12 to bend section 20. The core 300 is initially deep in body 11 of support member 10 at and near proximal end 12 in front-end section 312, and and gradually moves toward the upper surface 22 at bend section 20. Since the patterned overclad layer 623 provides in-plane lateral alignment while the bend section 20 provides out-of-plane lateral alignment, core 300 is no longer needed to form waveguide 350. The waveguide index of refraction can be gradually reduced from a weakly guiding structure (FIG. 18A) to no index of refraction delta (FIG. 18C) once the patterned overclad layer 623 is reached. This configuration for core 300 can be achieved by gradually decreasing the amount of power in laser beam 220 during the laser writing of the core.

The transition of core 300 from distal end 14 to bend section 20 can be identical or substantially the same, i.e., core 300 is absent at bend section 20 and then its refractive index gradually increases until the core refractive index is reached for the back-end section 324 of the core that extends to distal end 14. The overclad layer 623 extends only as far as necessary to ensure waveguide 350 is defined over the portion of bend section 20 where the core refractive index $n_c$ becomes so small that the overclad is required for continued optical confinement of guide wave 352.

The various embodiments of the present disclosure have a number of advantages. The laser written waveguides include portions that reside near the glass outer surface and provide strong optical confinement for tight bends, enabling extremely low profile optical interface devices and thus compact photonic devices. The mode field diameter and the aspect ratio of the laser written waveguide can change along the length of the waveguide to minimize coupling losses between optical fibers and active devices with dissimilar mode field sizes.

The degree of optical confinement, especially at the bend section, can be modified by including a low-index coating or an overclad layer.

In an example, the optical interface device disclosed herein has an all-glass construction that enables the use of light-curable adhesives. The laser written waveguides build flexibility into the assembly process, enabling excellent alignment of written waveguides to existing fiber arrays. The laser written waveguide process can accommodate optical fiber arrays and active devices on arbitrary 1D and 2D pitches, allowing the optical interface device to function as a pitch converter or furcation element.

The support member can be made of glass and fabricated using low-cost glass drawing processes known in the art. The optical interface device can also be made by heating and bending inexpensive fusion drawn glass sheets into desired profile prior to waveguide writing. The laser written waveguides allow low precision attachment of optical fiber array to bent glass component, reducing manufacturing cost and complexity.

The use of glasses that are CTE-matched to silicon ensures low stresses at mechanical joints under thermal cycling for high reliability interconnections to silicon-based devices. The use of a polymer overclad layer on the glass bend section protects the glass bend surface from damage during assembly and in use, minimizing optical scattering losses and potential mechanical failure by preventing scratches in the glass surface.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of forming an optical Interface device for optically connecting at least one photonic device to at least one optical device via at least one optical fiber, comprising:
    providing a support member having glass body with a refractive index $n_b$, a proximal end, a distal end and an outer surface, wherein the glass body includes a bend section that includes a curved portion of the outer surface, with the curved portion of the outer surface being interfaced with either air or a dielectric coating having a refractive index $n_1 < n_b$;
    laser writing at least one core in the glass body, the at least one core having a refractive index $n_c > n_b$ and an outer edge closest to the outer surface and that resides within 10 microns of the curved portion of the outer surface; and
    wherein the at least one core defines at least one curved optical waveguide.

2. The method according to claim 1, wherein the at least one curved optical waveguide is further defined by a portion of the glass body adjacent the core and either the air or the dielectric coating.

3. The method according to claim 1, wherein the support member includes a front-end section, and wherein the front-end section includes an optical fiber support feature.

4. The method according to claim 1, wherein the core is closest to the outer surface at the curved portion of the outer surface.

5. The method according to claim 1, wherein the support member has a vertical dimension LY in the range 2 millimeters ≤ LY ≤ 4 millimeters.

6. The method according to claim 1, wherein the at least one core has a central axis, and wherein the at least one core has a bend radius RB measured relative to the central axis in the range 1 millimeters ≤ RB ≤ 4 millimeters.

7. The method according to claim 1, wherein the at least one core constitutes a plurality of cores and wherein the proximal ends of the cores define a first pitch and the distal ends of the cores define a second pitch.

8. The method according to claim 1, wherein the at least one curved optical waveguide has a refractive index difference $\delta = n_c - n_b$ in the range $0.01 \le \delta \le 0.02$.

9. The method according to claim 1, wherein the at least one core has a length, and wherein the laser writing is performed such that a refractive Index difference $\delta = n_c - n_b$ varies over the length of the core.

10. The method according to claim 3, wherein the support member has a back-end section further comprising:
    optically coupling the at least one optical fiber to the front-end section; and
    optically coupling the at least one photonic device to the back-end section.

11. The method according to claim 1, further comprising optically coupling the at least one optical fiber to the at least one optical device.

12. The method according to claim 1, wherein the support member is laminated structure that includes upper and lower glass sheets, and wherein the glass body and the outer surface are defined by the upper glass sheet.

13. The method according to claim 12, wherein the upper and lower glass sheets are each made of a chemically strengthened glass.

14. The method according to claim 13, wherein:
    the laser writing of the at least one core is performed in the upper glass sheet while the laminated structure is flat, and then bending the laminated structure to form the at least one curved optical waveguide.

15. The method according to claim 12, wherein the upper and lower glass sheets sandwich a light-curable adhesive, and wherein the light-curable adhesive is light cured after the bending of the laminated structure.

16. The method according to claim 12, wherein the upper glass sheet Includes a front edge, and further comprising optically coupling the least one optical fiber with the at least one curved optical waveguide at the front edge of the upper glass sheet.

17. The method according to claim 1, wherein the support member is monolithic.

18. The method according to claim 17, further comprising forming the monolithic support member by drawing a glass preform.

* * * * *